United States Patent
Shah et al.

(10) Patent No.: US 12,519,721 B2
(45) Date of Patent: Jan. 6, 2026

(54) SHARING SERVICE CHAINS ACROSS USER VPNS BY SEGMENT PRESERVATION

(71) Applicant: Cisco Technology, Inc., San Jose, CA (US)

(72) Inventors: Avinash Shah, Pleasanton, CA (US); Pritam Baruah, Fremont, CA (US); Amjad Inamdar, Karnataka (IN); Laxmikantha Reddy Ponnuru, San Ramon, CA (US); Latika Ahuja, Haryana (IN); Jai Prakash Agrawal, Bilaspur (IN)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 18/471,931

(22) Filed: Sep. 21, 2023

(65) Prior Publication Data

US 2025/0106149 A1 Mar. 27, 2025

(51) Int. Cl.
*H04L 45/00* (2022.01)
*H04L 9/40* (2022.01)
*H04L 45/745* (2022.01)

(52) U.S. Cl.
CPC .......... *H04L 45/566* (2013.01); *H04L 45/745* (2013.01); *H04L 63/0272* (2013.01)

(58) Field of Classification Search
CPC .. H04L 45/566; H04L 45/745; H04L 63/0272
See application file for complete search history.

(56) References Cited

U.S. PATENT DOCUMENTS

| | | | |
|---|---|---|---|
| 6,549,516 B1 * | 4/2003 | Albert | H04L 67/1001 370/236 |
| 7,640,319 B1 * | 12/2009 | Sylvain | H04L 61/2514 709/245 |
| 10,257,167 B1 * | 4/2019 | Matthews | H04L 12/4641 |
| 11,552,889 B1 | 1/2023 | Panchal et al. | |

(Continued)

FOREIGN PATENT DOCUMENTS

CN 114785725 A 7/2022

OTHER PUBLICATIONS

International Search Report and Written Opinion for International Application No. PCT/US2024/046948, mailed Nov. 19, 2024, 9 Pages.

*Primary Examiner* — Madhu Woolcock
(74) *Attorney, Agent, or Firm* — Polsinelli P.C.

(57) ABSTRACT

A system facilitates communication between branches of an SD-WAN and a service chain element. A hub node receives a data packet of a flow from a source branch over a VPN segment to be transmitted to a destination branch, extracts flow information from the data packet including VPN segment information to be stored in a flow table before transmitting the data packet to the service chain element over a service chain VPN. Upon return of the data packet from the service chain element, the hub node uses packet tuple information to retrieve the flow information with VPN segment information from the flow table. The hub node can then forward the data packet to the destination branch over the VPN segment. The hub node can generate and store an Auto Service Chaining Key that connects bidirectional flows so that the hub node can apply service-chaining to bidirectional traffic.

20 Claims, 14 Drawing Sheets

(56) References Cited

U.S. PATENT DOCUMENTS

| | | | |
|---|---|---|---|
| 2005/0071453 A1* | 3/2005 | Ellis | H04L 43/04 |
| | | | 709/223 |
| 2007/0121615 A1* | 5/2007 | Weill | H04L 47/20 |
| | | | 370/389 |
| 2008/0095054 A1* | 4/2008 | Morford | H04L 41/0896 |
| | | | 370/231 |
| 2009/0147781 A1* | 6/2009 | Lee | H04L 12/2801 |
| | | | 370/389 |
| 2011/0023090 A1 | 1/2011 | Asati et al. | |
| 2013/0170502 A1* | 7/2013 | Chen | H04L 12/4641 |
| | | | 370/401 |
| 2015/0188949 A1* | 7/2015 | Mahaffey | H04W 12/03 |
| | | | 726/1 |
| 2015/0381493 A1 | 12/2015 | Bansal et al. | |
| 2016/0149795 A1* | 5/2016 | Kang | H04L 45/74 |
| | | | 370/254 |
| 2016/0352629 A1* | 12/2016 | Wang | H04L 45/38 |
| 2017/0019335 A1 | 1/2017 | Schultz et al. | |
| 2017/0019373 A1* | 1/2017 | Meng | H04L 12/6418 |
| 2017/0064749 A1* | 3/2017 | Jain | H04L 69/22 |
| 2017/0244631 A1* | 8/2017 | Guichard | H04L 45/306 |
| 2017/0339072 A1 | 11/2017 | Pignataro et al. | |
| 2019/0182155 A1 | 6/2019 | Chang | |
| 2019/0238457 A1 | 8/2019 | T | |
| 2020/0382420 A1 | 12/2020 | Suryanarayana et al. | |
| 2021/0058388 A1* | 2/2021 | Knotwell | G06F 9/45558 |
| 2021/0136871 A1 | 5/2021 | Bull et al. | |
| 2021/0328832 A1* | 10/2021 | Norbutas | H04L 12/2807 |
| 2021/0377173 A1* | 12/2021 | Zhang | H04L 45/42 |
| 2022/0353171 A1 | 11/2022 | Ramaswamy et al. | |

\* cited by examiner 800 (CONT'D)

TRANSMIT, BY THE HUB NODE, THE FIRST DATA PACKET TO THE DESTINATION BRANCH OVER THE FIRST VPN SEGMENT BASED ON THE FIRST PACKET TUPLE INFORMATION AND THE FIRST VPN SEGMENT INFORMATION ASSOCIATED WITH THE FIRST DATA PACKET 818

RECEIVE, AT THE HUB NODE AND FROM THE SOURCE BRANCH OF THE NETWORK OVER THE FIRST VPN SEGMENT, A SECOND DATA PACKET OF THE FIRST FLOW DESTINED FOR THE DESTINATION BRANCH OF THE NETWORK, THE SECOND DATA PACKET INCLUDING SECOND METADATA THAT CORRESPONDS WITH FIRST METADATA OF THE FIRST DATA PACKET 820

DETERMINE, UPON RECEIPT OF THE SECOND DATA PACKET AT THE HUB NODE FROM THE SOURCE BRANCH, THAT THE SECOND DATA PACKET BELONGS TO THE FIRST FLOW BASED ON THE SECOND METADATA OF THE SECOND DATA PACKET 822

ASSOCIATE, AT THE HUB NODE AND BASED ON THE SECOND METADATA OF THE SECOND DATA PACKET, THE SECOND DATA PACKET WITH THE FIRST FLOW INFORMATION 824

TRANSMIT, BY THE HUB NODE, THE SECOND DATA PACKET TO THE SERVICE CHAIN ELEMENT OVER THE SERVICE CHAIN VPN SEGMENT 826

FIG. 8B

SHARING SERVICE CHAINS ACROSS USER VPNS BY SEGMENT PRESERVATION

BACKGROUND

Software-defined wide area networks (SD-WANs) often employ virtual private networks (VPNs) to introduce segmentation into different areas of the SD-WAN. As with many networks, it is also advantageous to use service chain elements such as firewalls for network security purposes. However, many service chain elements, which may have their own service chain VPN segments, do not communicate information about source VPN segments when returning traffic for communication to a destination. This can cause problems when managing flows that belong to source VPN segments and service chain VPN segments. In a further aspect, bidirectional traffic is not easily accounted for in current technologies. Current solutions are either not scalable or defeat the purpose of SD-WAN segmentation.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 8B further illustrates the routine of FIG. 8A in accordance with some embodiments of the present technology.

DESCRIPTION OF EXAMPLE EMBODIMENTS

Figure 1:
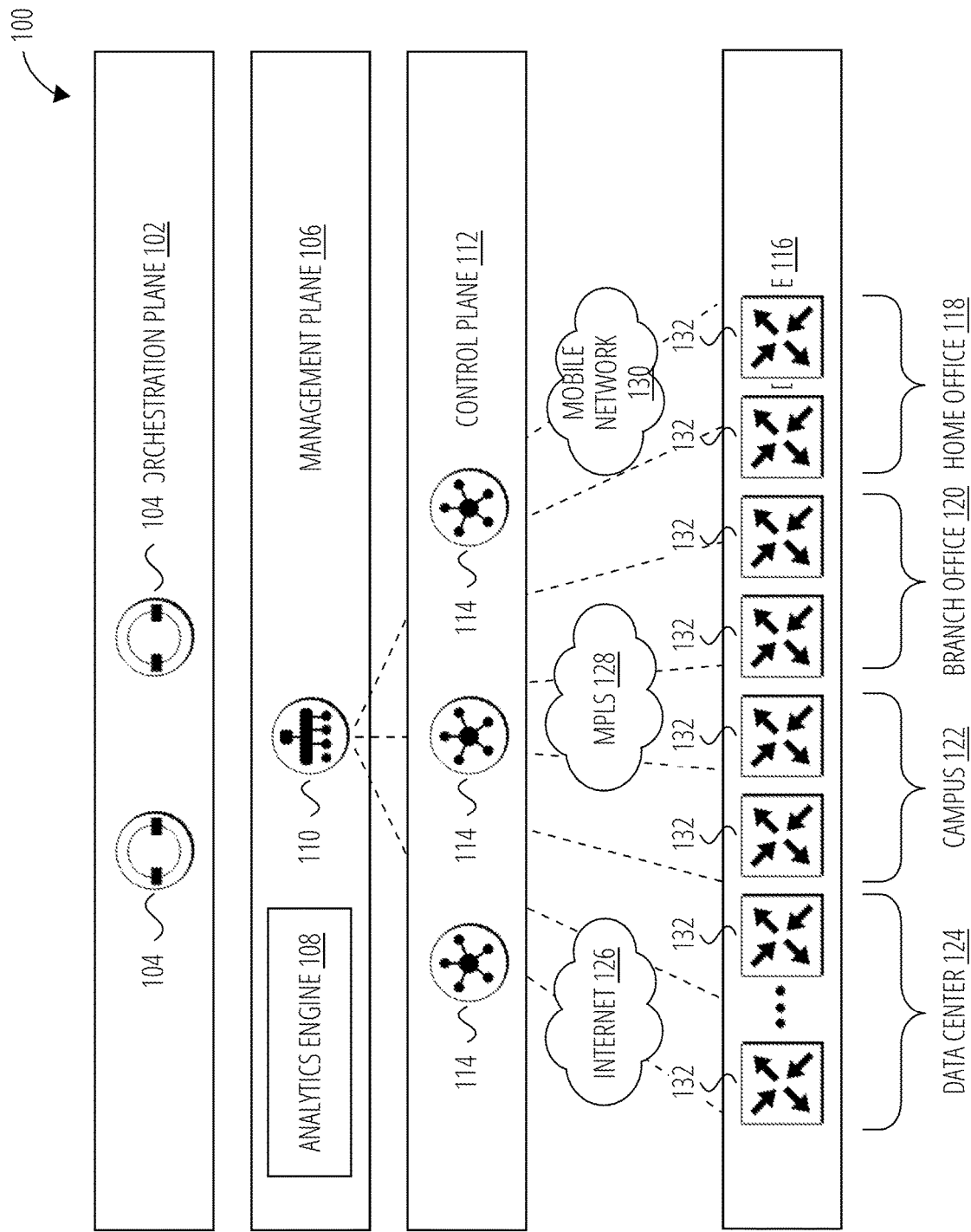
FIG. 1 illustrates an example of a high-level network architecture in accordance with some embodiments of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

A method outlined herein includes: receiving, at a hub node and from a source branch of a network over a first Virtual Private Network (VPN) segment, a first data packet of a first flow destined for a destination branch of the network; extracting, at the hub node, first flow information about the first flow associated with the first data packet including first VPN segment information associated with the first data packet, the first flow information about the first data packet including first packet tuple information associated with the first data packet; and transmitting, by the hub node, the first data packet to a service chain element over a service chain VPN segment associated with the service chain element, wherein the first VPN segment is different from the service chain VPN segment.

The first data packet can have a header including first metadata, the first metadata including the first VPN segment information that indicates the first VPN segment and the first packet tuple information for the first data packet. The method can further include removing the first VPN segment information from the header prior to transmission of the first data packet to the service chain element over the service chain VPN segment.

In some examples, the method can further include: receiving, at the hub node and from the service chain element over the service chain VPN segment, the first data packet following processing by the service chain element; retrieving, at the hub node and based on the first flow information and the first packet tuple information associated with the first data packet, the first VPN segment information of the first flow associated with the first data packet; and transmitting, by the hub node, the first data packet to the destination branch over the first VPN segment based on the first packet tuple information and the first VPN segment information associated with the first data packet. The method can also include: searching, at the hub node and based on the first packet tuple information of the first data packet, a flow table for retrieval of the first VPN segment information of the first flow associated with the first data packet, where the flow table includes the first flow information extracted by the hub node and associates the first packet tuple information of the first data packet with the first flow information. Further, the method can include identifying, at the hub node and based on a match between the first packet tuple information of the first data packet and the first flow information within the flow table, that the first data packet is associated with the first flow and the first VPN segment.

The method can also include identifying, at the hub node and based on service chain information of the first data packet, that the first data packet is to be transmitted to the service chain element over the service chain VPN segment.

In some examples, the method can include: receiving, at the hub node and from the source branch of the network over the first VPN segment, a second data packet of the first flow destined for the destination branch of the network, the second data packet including second metadata that corresponds with first metadata of the first data packet; determining, upon receipt of the second data packet at the hub node from the source branch, that the second data packet belongs to the first flow based on the second metadata of the second data packet; associating, at the hub node and based on the second metadata of the second data packet, the second data packet with the first flow information; and transmitting, by the hub node, the second data packet to the service chain element over the service chain VPN segment.

In other examples, the method can include: receiving, at the hub node and from the source branch over a second VPN segment, a second data packet of a second flow destined for a second destination branch, the second flow being different from the first flow; extracting, at the hub node, second flow information about the second flow associated with the second data packet including second VPN segment information associated with the second data packet, the second flow information about the second data packet including second packet tuple information associated with the second data packet; and transmitting, by the hub node, the second data packet to the service chain element over the service chain VPN segment, wherein the second VPN segment is different from the service chain VPN segment. Further, the method can include: receiving, at the hub node and from the service chain element over the service chain VPN segment, the second data packet following processing by the service chain element; retrieving, at the hub node and based on the second packet tuple information associated with the second data packet, the second VPN segment information of the second flow associated with the second data packet; and transmitting, by the hub node, the second data packet to the destination branch over the second VPN segment based on the second VPN segment information associated with the second data packet.

A method is also outlined herein that includes: receiving, at a hub node, a first data packet belonging to a first flow associated with a first Virtual Private Network (VPN) segment; and searching, at the hub node and based on first packet tuple information associated with the first data packet, a flow table for retrieval of first flow information including first VPN segment information associated with the first data packet.

In examples where the hub node receives the first data packet from a source branch over the first VPN segment and where the first flow information is not present within the flow table, the method can further include: extracting, at the hub node, the first flow information associated with the first data packet including the first VPN segment information and the first packet tuple information associated with the first data packet; storing, by the hub node, the first flow information at the flow table; and transmitting, by the hub node, the first data packet to a service chain element over a service chain VPN segment associated with the service chain element, wherein the first VPN segment is different from the service chain VPN segment.

In examples where the hub node receives the first data packet from a source branch over the first VPN segment and where the first flow information is present within the flow table, the method can further include: associating, at the hub node, the first flow information from the flow table with the first data packet including first VPN segment information and the first packet tuple information associated with the first data packet; and transmitting, by the hub node, the first data packet to a service chain element over a service chain VPN segment associated with the service chain element, wherein the first VPN segment is different from the service chain VPN segment.

In examples where the hub node receives the first data packet from a service chain element over a service chain VPN segment and where the first flow information is present within the flow table, the method can further include: retrieving, at the hub node and based on the first packet tuple information associated with the first data packet, the first flow information from the flow table including the first VPN segment information associated with the first data packet; and transmitting, by the hub node, the first data packet to a destination branch over the first VPN segment based on the first packet tuple information and the first VPN segment information associated with the first data packet, wherein the first VPN segment is different from the service chain VPN segment.

A system is also outlined herein that includes a hub node of a network, the hub node including a processor in communication with a memory and a network interface, the memory including instructions executable by the processor to: access, at the processor and over the network interface, a first data packet belonging to a first flow associated with a first Virtual Private Network (VPN) segment; and search, at the processor and based on first packet tuple information associated with the first data packet, a flow table for retrieval of first flow information including first VPN segment information associated with the first data packet. The memory of the hub node can include instructions executable by the processor to: identify, at the processor and based on a match between the first packet tuple information of the first data packet and the first flow information within the flow table, that the first data packet is associated with the first flow and the first VPN segment.

The present disclosure also outlines a non-transitory computer-readable medium having embodied thereon a program executable by a processor to perform a method for facilitating service chain sharing in an SD-WAN network, the method including: receiving, at a hub node and from a source branch of a network over a first Virtual Private Network (VPN) segment, a first data packet of a first flow destined for a destination branch of the network; extracting, at the hub node, first flow information about the first flow associated with the first data packet including first VPN segment information associated with the first data packet, the first flow information about the first data packet including first packet tuple information associated with the first data packet; and transmitting, by the hub node, the first data packet to a service chain element over a service chain VPN segment associated with the service chain element, wherein the first VPN segment is different from the service chain VPN segment.

Further, a method outlined herein can include (for traffic ingressing from a destination branch): receiving, at a hub node and from a destination branch over a second VPN segment, an ingress data packet belonging to a first flow for transmission to a service chain element; extracting, at the hub node and based on ingress packet tuple information associated with the ingress data packet, an Auto Service Chaining Key of the first flow; and forwarding, by the hub node, the ingress data packet to the service chain element over a service chain VPN segment associated with the service chain element based on first flow information associated with the Auto Service Chaining Key of the first flow. The destination branch can include an edge network device implementing or otherwise facilitating a Software as a Service (SaaS) process.

The method can include: retrieving, by the hub node and from a flow table, the first flow information associated with the ingress data packet based on the Auto Service Chaining Key, wherein the Auto Service Chaining Key connects ingress packet tuple information associated with the ingress data packet and second VPN segment information of the second VPN segment associated with the destination branch with the first flow information present within the flow table.

The method can further include: generating, at the hub node and for an egress data packet belonging to the first flow for transmission to the destination branch, the Auto Service Chaining Key of the first flow based on egress packet tuple information associated with the egress data packet; storing, by the hub node and at a flow table, the Auto Service Chaining Key in association with first flow information of the first flow, wherein the Auto Service Chaining Key indicates that traffic associated with the first flow is to be directed through the service chain element; and transmitting, by the hub node, the egress data packet to the destination branch over a second VPN segment associated with the destination branch. The Auto Service Chaining Key includes second VPN segment information of the second VPN segment associated with the destination branch. The egress data packet can be associated with forward traffic of the first flow that flows from a source branch to the destination branch. The egress data packet has been subjected to service-chaining prior to generation of the Auto Service Chaining Key. The ingress data packet is associated with return traffic of the first flow that flows from the destination branch to the source branch. The source branch can include an SD-WAN router associated with a user device and is in operative communication with the hub node through the network interface of the hub node.

A system is also outlined herein that includes a hub node of a network, the hub node including a processor in communication with a memory and a network interface, the memory including instructions executable by the processor to: access, at the processor, an ingress data packet belonging to a first flow received from a destination branch over a second VPN segment for transmission to a service chain element; extract, at the processor and based on ingress packet tuple information associated with the ingress data packet, an Auto Service Chaining Key of the first flow; and forward, by the network interface in communication with the processor, the ingress data packet to the service chain element over a service chain VPN segment associated with the service chain element based on first flow information associated with the Auto Service Chaining Key of the first flow. The destination branch can include an edge network device implementing or otherwise facilitating a Software as a Service (SaaS) process.

The memory can further include instructions executable by the processor to retrieve, by the processor and from a flow table, the first flow information associated with the ingress data packet based on the Auto Service Chaining Key, where the Auto Service Chaining Key connects ingress packet tuple information associated with the ingress data packet and second VPN segment information of the second VPN segment associated with the destination branch with the first flow information present within the flow table.

The memory can further include instructions executable by the processor to: generate, at the processor and for an egress data packet belonging to the first flow for transmission to the destination branch, the Auto Service Chaining Key of the first flow based on egress packet tuple information associated with the egress data packet; store, by the processor and at a flow table, the Auto Service Chaining Key in association with first flow information of the first flow, wherein the Auto Service Chaining Key indicates that traffic associated with the first flow is to be directed through the service chain element; and transmit, by the network interface in communication with the processor, the egress data packet to the destination branch over a second VPN segment associated with the destination branch. The Auto Service Chaining Key includes second VPN segment information of the second VPN segment associated with the destination branch. The egress data packet can be associated with forward traffic of the first flow that flows from a source branch to the destination branch, where the egress data packet has been subjected to service-chaining prior to generation of the Auto Service Chaining Key. The ingress data packet is associated with return traffic of the first flow that flows from the destination branch to the source branch. The source branch can include an SD-WAN router associated with a user device and is in operative communication with the hub node through the network interface of the hub node The present disclosure also outlines a non-transitory computer-readable medium having embodied thereon a program executable by a processor to perform a method for facilitating bi-directional service chaining for traffic through the SD-WAN, the method including: accessing, at the processor, an ingress data packet belonging to a first flow received from a destination branch over a second VPN segment for transmission to a service chain element; extracting, at the processor and based on ingress packet tuple information associated with the ingress data packet, an Auto Service Chaining Key of the first flow; and forwarding, by a network interface in communication with the processor, the ingress data packet to the service chain element over a service chain VPN segment associated with the service chain element based on first flow information associated with the Auto Service Chaining Key of the first flow. The destination branch can include an edge network device implementing or otherwise facilitating a Software as a Service (SaaS) process Further, the method associated with the non-transitory computer-readable medium can further include: retrieving, by the processor and from a flow table, the first flow information associated with the ingress data packet based on the Auto Service Chaining Key, where the Auto Service Chaining Key connects ingress packet tuple information associated with the ingress data packet and second VPN segment information of the second VPN segment associated with the destination branch with the first flow information present within the flow table.

The method associated with the non-transitory computer-readable medium can further include: generating, at the processor and for an egress data packet belonging to the first flow for transmission to the destination branch, the Auto Service Chaining Key of the first flow based on egress packet tuple information associated with the egress data packet; storing, by the processor and at a flow table, the Auto Service Chaining Key in association with first flow information of the first flow, wherein the Auto Service Chaining Key indicates that traffic associated with the first flow is to be directed through the service chain element; and transmitting, by the network interface in communication with the processor, the egress data packet to the destination branch over a second VPN segment associated with the destination branch. The Auto Service Chaining Key can include second VPN segment information of the second VPN segment associated with the destination branch. The egress data packet is associated with forward traffic of the first flow that flows from a source branch to the destination branch, and the egress data packet has been subjected to service-chaining prior to generation of the Auto Service Chaining Key. The ingress data packet is associated with return traffic of the first flow that flows from the destination branch to the source branch. The source branch can include an SD-WAN router associated with a user device and is in operative communication with the hub node through the network interface of the hub node.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

SD-WAN (Software-Defined Wide Area Network) services are commonly deployed across a plurality of different "branches" of an SD-WAN, where each "branch" can represent a site (e.g., an office) of an interconnected network. SD-WANs can use Virtual Private Network segments and service chain elements such as firewalls to protect information between smaller divisions of each branch. Consider an example where a first branch represents an office in a first city and a second branch represents an office in a second city. Individual departments (e.g., finance, human resources (HR), engineering, etc.) having presences at both offices may have their own VPN segments that "segment" the SD-WAN to protect information between them (e.g., HR and Finance departments having separate VPNs but sharing two branches). Someone in the HR department at the first branch (e.g., a "source" branch) may want to establish a "flow", sending data to another person in the HR department at the second branch (e.g., a "destination" branch) over a first VPN segment (e.g., VPN1) associated with HR. Likewise, someone in the finance department at a source branch may also want to establish a "flow", sending data to another person in the finance department at a destination branch over a second VPN segment (e.g., VPN2) associated with finance. The network needs to be able to process both "flows" through a service chain element (such as a firewall) that will usually have its own VPN segment (e.g., a service chain VPN).

The service chain element (e.g., a firewall) enables a user or organization to inspect traffic from the source branch to the destination branch for all LAN networks hosted in connection with the hub node using a policy. In this case, traffic diverted from the source branch to the hub node for processing at the service chain element does not carry source VPN information (e.g., VPN1 or VPN2 associated with the source branch and destination branch), and instead carries info about the "destination VPN", which in this case would be the service chain VPN associated with the service chain element (e.g., VPN10). At the hub node, data packets from the source branch are routed towards the service chain element over the service chain VPN. The returning data packets from the service chain element (which now "belong" to the service chain VPN) need to be routed towards their original destination branch over the source VPN segment (e.g., VPN1). However, as the source VPN segment and service chain VPN segment are different and the information about the source VPN segment is not retained when processed by the service chain element, these data packets can get dropped. Under current policies, there are two options to overcome this issue:

1. Keep the service chain VPN segment and source VPN segment the same. In order to keep the source VPN segment and service chain VPN segment the same, this would require individual service chains per VPN segment which is not scalable.
2. Leak the route between the service chain VPN segment and the source VPN segment. This can cause a routing table to "explode" and can defeat the intention of segmenting source VPN segments and service chain VPN segments. This solution can violate the security constraints.

The disclosed technology addresses the need in the art for systems and methods to maintain VPN segment preservation while allowing scalability for service chain elements of an SD-WAN. The systems and methods outlined herein enable a data packet to carry information about the source VPN segment from the source branch to the hub node. The hub node extracts information about the source VPN segment and removes this information from the data packet before diverting the data packet to the service chain element. Upon return of the data packet from the service chain element, the hub node can use packet tuple information associated with the data packet to retrieve the information about the source VPN segment for the data packet. Using the information about the source VPN segment, the hub node can forward the data packet onward to the destination branch over the source VPN segment.

The following provides a simplified outline of a process for:

1. Packet flow from Source Branch towards the hub node and to the service chain element
    1. Data packet arrives at hub node from source branch to be Service-Chained.
    2. Hub node creates a common flow entry (flow information, F1) for the flow within a flow table with the source VPN segment (e.g., VPN1 or VPN2) as well as with the service chain VPN segment (VPN10). Source VPN segment Info along with packet tuple information is stored as part of feature data (flow information, Flow Data F1) for the flow (F1).
    3. Hub node redirects data packet to the service chain element (firewall). The source VPN segment info can be removed from the data packet prior to transmission to the service chain element.
2. Packet flow from service chain element to hub node and towards destination branch
    1. Data packet returns back from service chain element to hub node. The data packet can include packet tuple info.
    2. Hub node performs flow lookup with information about the service chain VPN segment (VPN10) and the packet tuple info of the data packet to find a corresponding flow entry within the flow table. This enables the hub node to match the data packet with the flow information for F1, which was created before sending the data packet towards the service chain element (Firewall). The hub node can fetch the flow information (Flow Data F1) for the packet which includes source VPN segment Info for the source VPN segment (e.g., VPN1 or VPN2).

3. Data packets received at the hub node from the service chain element that belong to the same flow are routed towards the destination branch over the source VPN segment (e.g., VPN1 or VPN2).

To summarize, key contributions of the present disclosure enable an SD-WAN to:

1. Carry information about the source VPN segment from the source branch to the hub node. In some aspects, SD-WAN Metadata (MDATA) is enhanced to carry information about the source VPN segment (e.g., VPN1 or VPN2) from the source branch (e.g., Branch1, Branch2) to the hub node. MDATA can be a custom packet header used to carry information from one router to other and is outlined herein.
2. Preserve the information about the source VPN segment while traffic is diverted towards the service chain element and restore the information back when the traffic returns from the service chain element. A flow entry can be created within a flow table for a flow associated with the source VPN segment (e.g., VPN1 or VPN2), and also the same flow is associated with the service chain VPN segment (e.g., VPN10), before redirecting traffic towards the service chain element (e.g., firewall). As part of the feature data for the flow, information about the source VPN segment (e.g., VPN1 or VPN2) info is stored.
   a. Upon return of the data packet from the service chain element, the hub node searches within a flow table using the packet tuple info for the data packet with the Service VPN (VPN10), which can be matched up to the flow entry associated with the data packet that was recorded before transmission to the service chain element. With this, the information about the source VPN segment (e.g., VPN1 or VPN2) can be fetched from the feature data for the flow.
   b. Using the information about the source VPN segment (e.g., VPN1 or VPN2), the hub node can facilitate routing of the data packet towards the second branch over the source VPN segment (e.g., VPN1 or VPN2).

With the segment preservation on the service chain, the present technology provides scalable and secured sharing of service chain elements across various user segments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 106, a control plane 112, and a data plane 116. The orchestration plane 102 can assist in the automatic on-boarding of data planes 116 (e.g., switches, routers, etc.) in an overlay network. The orchestration plane 102 can include one or more physical or virtual network orchestrator appliance(s) 104. The network orchestrator appliance(s) 104 can perform the initial authentication of the data planes 116 and orchestrate connectivity between devices of the control plane 112 and the data plane 116. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 106 can be responsible for central configuration and monitoring of a network. The management plane 106 can include one or more physical or virtual network management appliance(s) 110, and can in some examples include an analytics engine 108. In some embodiments, the network management appliance(s) 110 can provide centralized management of the network via a graphical user interface to enable a user to monitor, configure, and maintain the data planes 116 and links (e.g., internet transport network 126, MPLS network 128, 4G/Mobile network 130) in an underlay and overlay network. The network management appliance(s) 110 can support multi-tenancy and enable centralized management of logically isolated networks associated with different entities (e.g., enterprises, divisions within enterprises, groups within divisions, etc.). Alternatively or in addition, the network management appliance(s) 110 can be a dedicated network management system for a single entity. In some embodiments, physical or virtual Cisco® SD-WAN vManage appliances can operate as the network management appliance(s) 110.

The control plane 112 can build and maintain a network topology and make decisions on where traffic flows. The control plane 112 can include one or more physical or virtual network control appliance(s) 114. The network control appliance(s) 114 can establish secure connections to each data plane 116 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network control appliance(s) 114 can operate as route reflectors. The network control appliance(s) 114 can also orchestrate secure connectivity in the data plane 116 between and among the data planes 116. For example, in some embodiments, the network control appliance(s) 114 can distribute crypto key information among the data planes 116. This can allow the network to support a secure network protocol or application (e.g., Internet Protocol Security (IPSec), TRANSPORT Layer Security (TLS), Secure Shell (SSH), etc.) without Internet Key Exchange (IKE) and enable scalability of the network. In some embodiments, physical or virtual Cisco® SD-WAN vSmart controllers can operate as the network control appliance(s) 114.

The data plane 116 can be responsible for forwarding packets based on decisions from the control plane 112. The data plane 116 can include the data planes 116, which can be physical or virtual edge network devices. The data planes 116 can operate at the edges various network environments of an organization, such as in one or more data center(s) 124, campus network(s) 122, branch office network(s) 120, home office network(s) 118, and so forth, or in the cloud (e.g., Infrastructure as a Service (IaaS), Platform as a Service (PaaS), SaaS, and other cloud service provider networks). The data planes 116 can provide secure data plane connectivity among sites over one or more WAN TRANSPORTs, such as via one or more internet transport networks 126 (e.g., Digital Subscriber Line (DSL), cable, etc.), MPLS networks 128 (or other private packet-switched network (e.g., Metro Ethernet, Frame Relay, Asynchronous Transfer Mode (ATM), etc.), mobile networks 130 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The data planes 116 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the data planes 116.

Figure 2:
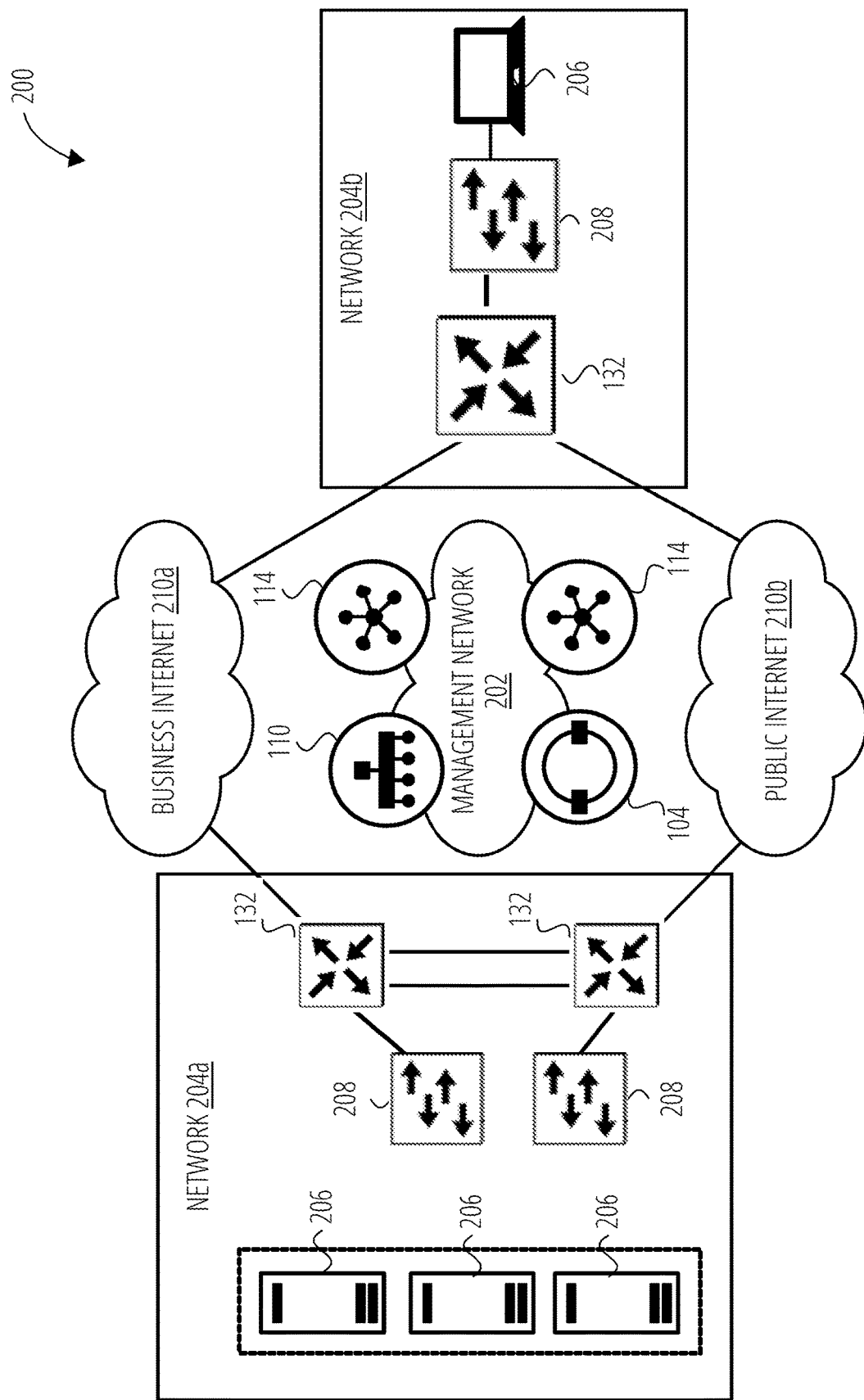
FIG. 2 illustrates an example of a network topology in accordance with some embodiments of the present technology.

FIG. 2 illustrates an example of a network topology 200 for showing various aspects of the network architecture 100. The network topology 200 can include a Management network 202, a pair of network sites 204A and 204B (also referred to herein as "sites", and collectively, 204) (e.g., the data center(s) 124, the campus network(s) 122, the branch office network(s) 120, the home office network(s) 118, cloud service provider network(s), etc.), and a pair of Internet transport networks (Business internet 210a and public internet 210b, collectively, 210). The Management network 202 can include one or more network orchestrator appliance(s) 104, one or more network management appliance(s) 110, and one or more network control appliance(s) 114. Although the Management network 202 is shown as a single network in this example, one of ordinary skill in the art will understand that each element of the Management network 202 can be distributed across any number of networks and/or be co-located with the sites 204. In this example, each element of the Management network 202 can be reached through either Internet transport network 210.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 132, and the edge network devices 132 can be used to directly connect to the internet transport networks (e.g., Business internet 210a and public internet 210b).

In some embodiments, "color" can be used to identify an individual WAN transport network, and different WAN transport networks may be assigned different colors (e.g., MPLS, private1, biz-internet, metro-ethernet, LTE, etc.). In this example, the network topology 200 can utilize a color called "biz-internet" for one Internet transport network (Business internet 210a) and a color called "public-internet" for another Internet transport network (public internet 210b).

In some embodiments, each edge network device 132 can form a Datagram TRANSPORT Layer Security (DTLS) or TLS control connection to the network control appliance(s) 114 and connect to any network control appliance 114 over each internet transport network (e.g., Business internet 210a and public internet 210b). In some embodiments, the edge network devices 132 can also securely connect to edge network devices in other sites via IPSec tunnels. In some embodiments, the BFD protocol may be used within each of these tunnels to detect loss, latency, jitter, and path failures.

On the edge network devices 132, color can be used help to identify or distinguish an individual WAN TRANSPORT tunnel (e.g., no same color may be used twice on a single edge network device). Colors by themselves can also have significance. For example, the colors metro-ethernet, MPLS, and private1, private2, private3, private4, private5, and private6 may be considered private colors, which can be used for private networks or in places where there is no NAT addressing of the TRANSPORT IP endpoints (e.g., because there may be no NAT between two endpoints of the same color). When the edge network devices 132 use a private color, they may attempt to build IPSec tunnels to other edge network devices using native, private, underlay IP addresses. The public colors can include 3g, biz, internet, blue, bronze, custom1, custom2, custom3, default, gold, green, LTE, public-internet, red, and silver. The public colors may be used by the edge network devices 132 to build tunnels to post-NAT IP addresses (if there is NAT involved). If the edge network devices 132 use private colors and need NAT to communicate to other private colors, the carrier setting in the configuration can dictate whether the edge network devices 132 use private or public IP addresses. Using this setting, two private colors can establish a session when one or both are using NAT.

Figure 3:
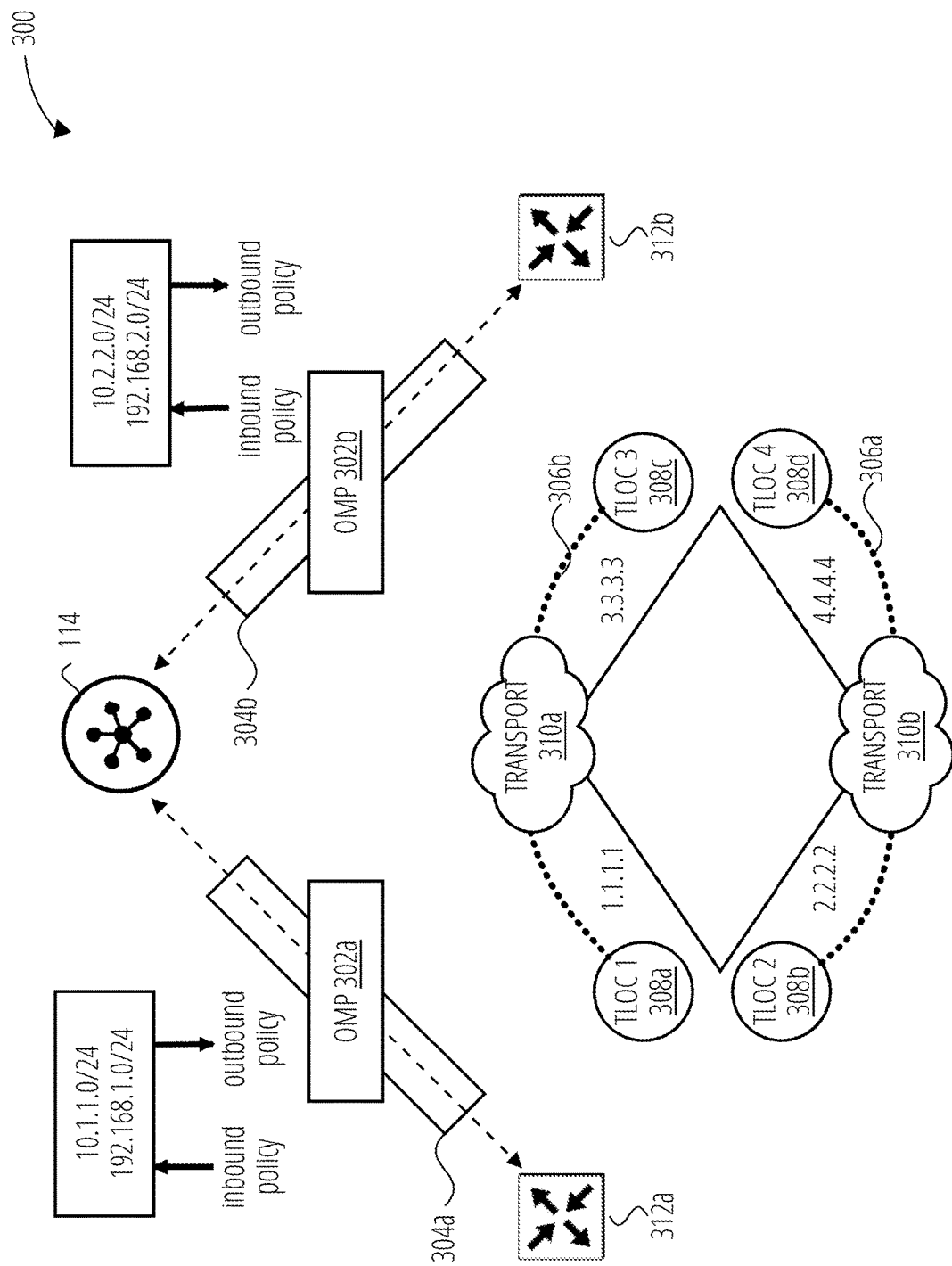
FIG. 3 illustrates an example of a diagram showing the operation of a protocol for managing an overlay network in accordance with some embodiments of the present technology.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network control appliance 114 and Edge Network Device edge network devices 312a and 312b (which can each be an edge network device 132 of FIG. 1), respectively, where control plane information, such as route prefixes, next-hop routes, crypto keys, policy information, and so forth, can be exchanged over respective secure DTLS or TLS connections 304A and 304B. The network control appliance 114 can operate similarly to a route reflector. For example, the network control appliance 114 can receive routes from the edge network devices 312a and 312b, process and apply any policies to them, and advertise routes to other edge network devices in the overlay. If there is no policy defined, the edge network devices 312a and 312b may behave in a manner similar to a full mesh topology, where each edge network device 312a or 312b can connect directly to another edge network device at another site and receive full routing information from each site.

OMP can advertise three types of routes:

OMP routes, which can correspond to prefixes that are learned from the local site, or service side, of the edge network device 312a or 312b. The prefixes can be originated as static or connected routes, or from within, for example, the OSPF or BGP protocols, and redistributed into OMP so they can be carried across the overlay. OMP routes can advertise attributes such as TRANSPORT location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network device 312a or 312b that connect into Transport network 310a or 310b (which can each be an internet transport network such as internet transport network 126 of FIG. 1). In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 312a or 312b when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 312a and 312b and accessible to other sites for use with service insertion. In addition, these routes can also include VPNs; the VPN labels can be sent in an update type to tell the network control appliance 114 what VPNs are serviced at a remote site.

In the example of FIG. 3, OMP is shown running over the DTLS/TLS tunnels 304a and 304b established between the edge network devices 312a and 312b and the network control appliance 114. In addition, the diagram 300 shows an IPSec tunnel 306A established between TLOC 308A and 308C over the (WAN) Transport network 310a and an IPSec tunnel 306B established between TLOC 308B and TLOC 308D over the (WAN) Transport network 310b. Once the IPSec tunnels 306A and 306B are established, BFD can be enabled across each of them.

Figure 4:
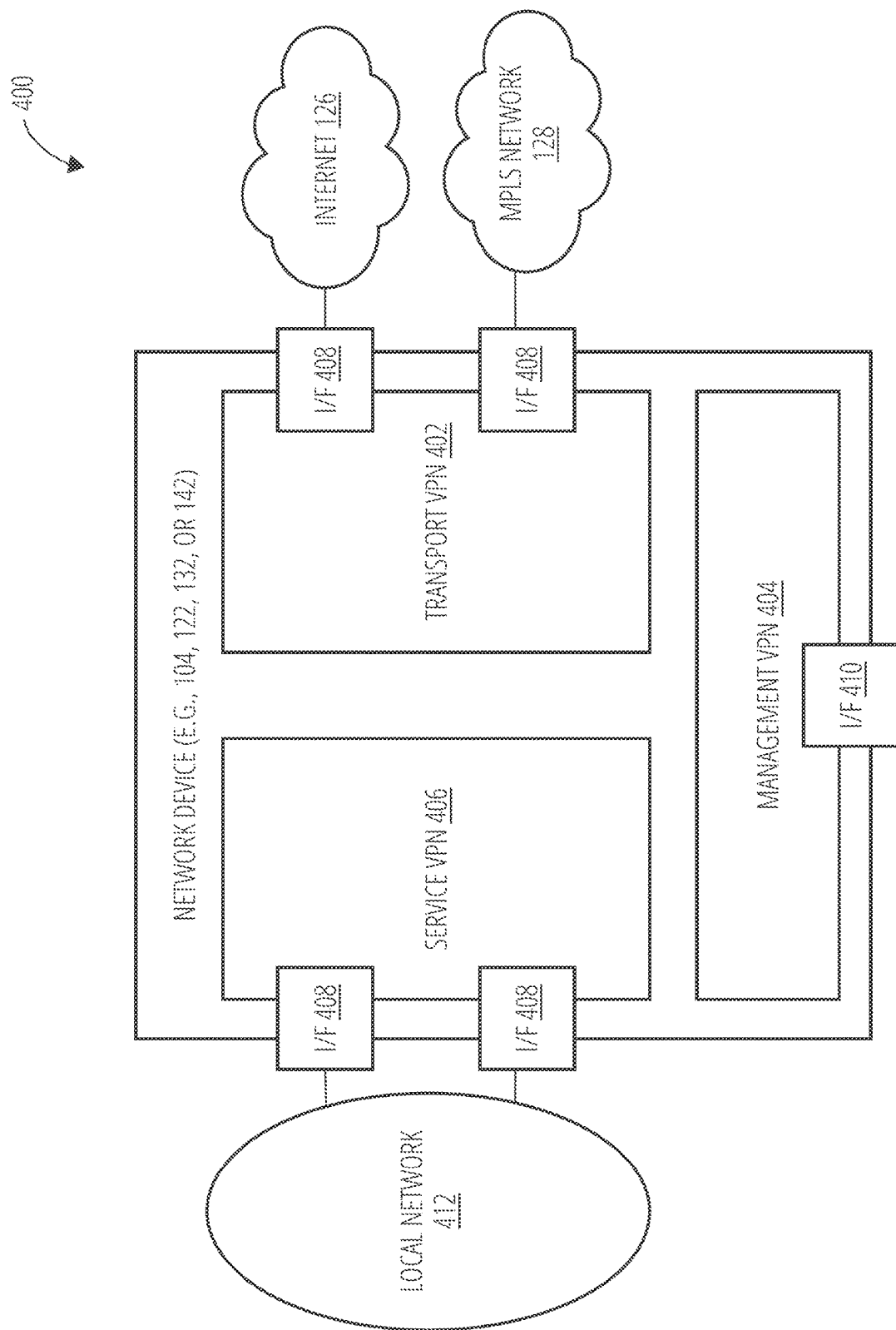
FIG. 4 illustrates an example of a diagram showing the operation of virtual private networks for segmenting a network in accordance with some embodiments of the present technology.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 110, network control appliance(s) 114, and/or edge network devices 132 can each include a transport VPN 402 (e.g., VPN number 0) and a Management VPN 404. The transport VPN 402 can include one or more physical or virtual network interfaces (I/F 408) that respectively connect to WAN TRANSPORT networks (e.g., the MPLS network 128 and the Internet transport network 126). Secure DTLS/TLS connections to the network control appliance(s) 114 or between the network control appliance(s) 114 and the network orchestrator appliance(s) 104 can be initiated from the transport VPN 402. In addition, static or default routes or a dynamic routing protocol can be configured inside the transport VPN 402 to get appropriate next-hop information so that the control plane 112 may be established and IPSec tunnels (not shown) can connect to remote sites.

The Management VPN 404 can carry out-of-band management traffic to and from the network orchestrator appliance(s) 104, network management appliance(s) 110, network control appliance(s) 114, and/or edge network devices 132 over a network interface (I/F 410). In some embodiments, the Management VPN 404 may not be carried across the overlay network.

In addition to the transport VPN 402 and the Management VPN 404, the network orchestrator appliance(s) 104, network management appliance(s) 110, network control appliance(s) 114, or edge network devices 132 can also include one or more service-side VPNs (Service VPN 406). The Service VPN 406 can include one or more physical or virtual network interfaces (I/Fs 408) that connect to one or more local-site networks (Local Network 412) and carry user data traffic. The Service VPN 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network control appliance(s) 114 at the Local Network 412 into the service-side VPN routing protocol. In turn, routes from the Local Network 412 can be advertised to other sites by advertising the service VPN routes into the OMP routing protocol, which can be sent to the network control appliance(s) 114 and redistributed to other edge network devices 132 in the network. Although the network interfaces (I/Fs 408 and 410) are shown to be physical interfaces in this example, one of ordinary skill in the art will appreciate that the interfaces in the transport and service VPNs can also be sub-interfaces instead.

Figure 5:
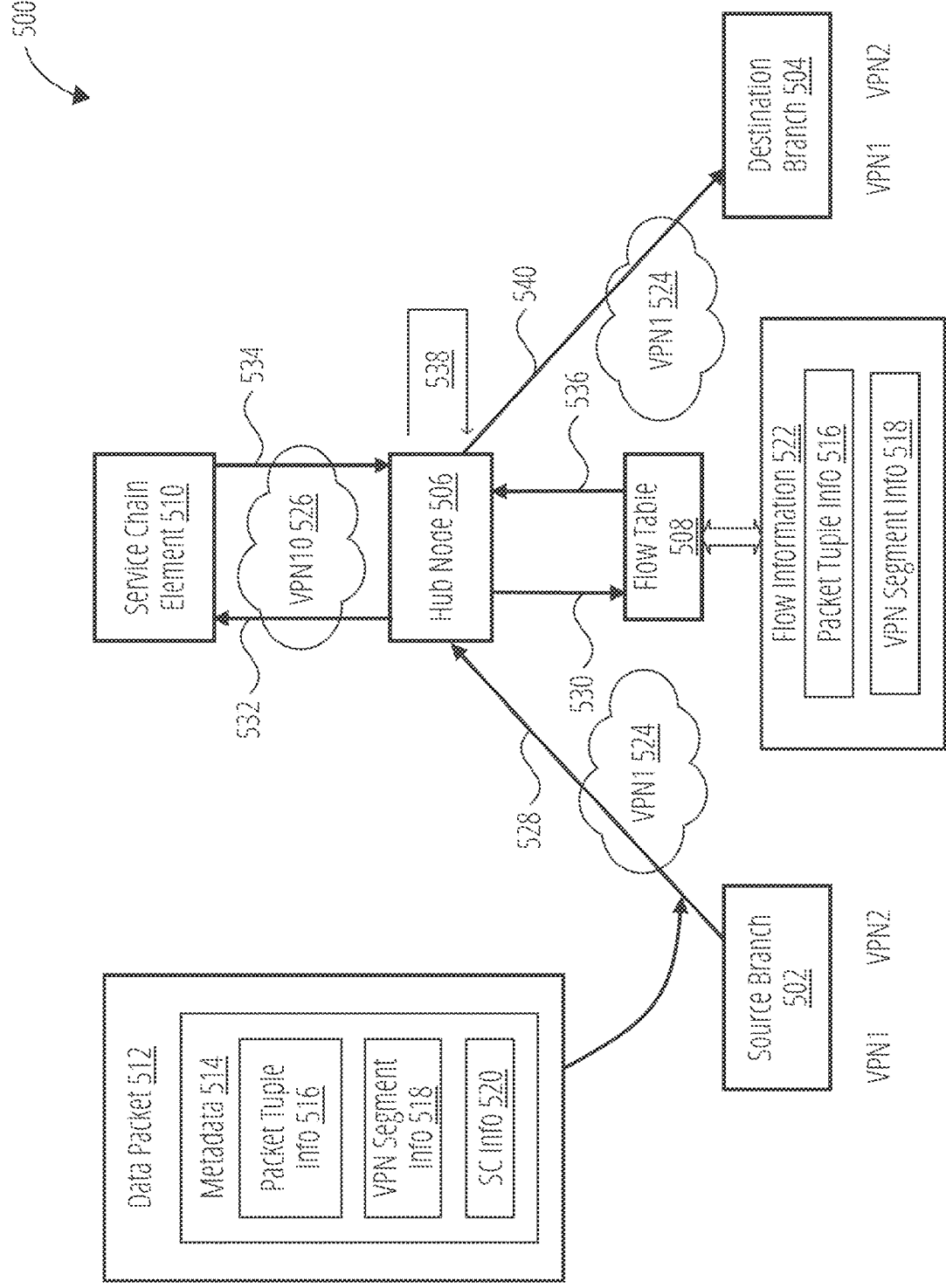
FIG. 5 illustrates an example of a diagram showing the operation of virtual private networks for segmenting a network in accordance with some embodiments of the present technology.

FIG. 5 shows an SD-WAN network 500 having a hub node 506 that facilitates establishment of a (new) first flow upon receipt of a data packet 512 from a source branch 502 over a first VPN segment 524, applies service chain functionalities at a service chain element 510 (e.g., firewall) over a Service Chain VPN segment 526, and forwards the data packet 512 to a destination branch 504 over the first VPN segment 524. The hub node 506 receives the data packet 512 belonging to a first flow from the source branch 502 over the first VPN segment 524 to be transmitted to the destination branch 504 over the first VPN segment 524, extracts flow information 522 of the first flow from the data packet 512 including first VPN segment Info 518, and stores the flow information 522 in a flow table 508. The hub node 506 then transmits the data packet 512 to the service chain element 510 over the Service Chain VPN segment 526 without the first VPN segment Info 518. Upon return of the data packet 512 from the service chain element 510, the hub node 506 uses packet tuple information of the data packet 512 to match the data packet 512 with the flow information 522 and retrieve the first VPN segment Info 518 from the flow table 508. The hub node 506 can forward the data packet 512 to the destination branch 504 over the first VPN segment 524.

The flow table includes flow entries for each flow created using packet tuple info (e.g., src-ip, dst-ip, proto, src-port, dst-port) and VPN segment. Here, a flow entry is created with with 2 keys (one associated with the source VPN segment and another associated with the service chain VPN segment), however the associated data within the flow entry is the same for both keys.

At first step 528, the hub node 506 receives the data packet 512 of a first flow from the source branch 502 over the first VPN segment 524 (e.g., VPN1). This data packet 512 can include metadata 514 including packet tuple info 516, first VPN segment Info 518 that indicates the first VPN segment 524, and service chain info 520. The metadata 514 can be within a header of the data packet 512. The hub node 506 can identify, based on the service chain info 520 of the data packet 512, that the data packet 512 is to be transmitted to the service chain element 510 over the Service Chain VPN segment 526 (e.g., VPN10).

At second step 530, the hub node 506 extracts the flow information 522 about the first flow associated with the data packet 512 based on the metadata 514 and records the flow information 522 within a flow table 508. In some examples, after receiving the data packet 512, the hub node 506 may first search the flow table 508 to see if the first flow associated with the data packet 512 has already been recorded. If not, the hub node 506 creates a new entry in the flow table 508 and populates the flow table 508 with the flow information 522. The flow information 522 can include the packet tuple info 516 and the VPN segment Info 518. The flow table 508 associates the packet tuple info 516 of the data packet 512 with the flow information 522 that includes information about the first flow.

At third step 532, the hub node 506 transmits the data packet 512 to the service chain element 510 over the Service Chain VPN segment 526 (VPN10). At this point, the data packet 512 may still retain the packet tuple info 516 in some form. The hub node 506 can remove the VPN segment Info 518 from the header of the data packet 512 prior to transmission of the data packet 512 to the service chain element 510 over the Service Chain VPN segment 526 (VPN10). The hub node 506 can also remove the service chain info 520 from the header of the data packet 512.

At fourth step 534, the hub node 506 receives the data packet 512 back from the service chain element 510 over the Service Chain VPN segment 526 (VPN10) following processing by the service chain element 510. The data packet 512 can include the packet tuple info 516 in some form, which can in some embodiments be expressed as a hash that can include packet tuple information such as source address, destination address and ports. The packet tuple info 516 retained within the data packet 512 received back from the service chain element 510 can be used to coordinate the data packet 512 with the flow information 522 that was previously stored within the flow table 508.

At fifth step 536, the hub node 506 searches the flow table 508 to find the flow information 522 that corresponds with the packet tuple info 516 associated with the data packet 512 upon receipt from the service chain element 510. Based on the flow information 522 and the packet tuple info 516 associated with the data packet 512, the hub node 506 retrieves the VPN segment Info 518.

At sixth step 538, the hub node 506 identifies that the data packet 512 is associated with the first flow and the first VPN segment 524 based on a match between the packet tuple info 516 of the data packet 512 received back from the service chain element 510 and the flow information 522 within the flow table 508.

At seventh step 540, the hub node 506 transmits the data packet 512 to the destination branch 504 over the first VPN segment 524 (VPN1) indicated by the VPN segment Info 518.

For additional data packets belonging to the same flow, the hub node 506 can associate these additional data packets with the flow information 522 in the flow table 508 rather than create an entirely new flow information entry for each new data packet. For additional data packets belonging to different flows (e.g., a second flow between the same branches over VPN2), the hub node 506 can identify that these data packets are from a new flow and will create a new flow information entry for the new flow.

Figure 6:
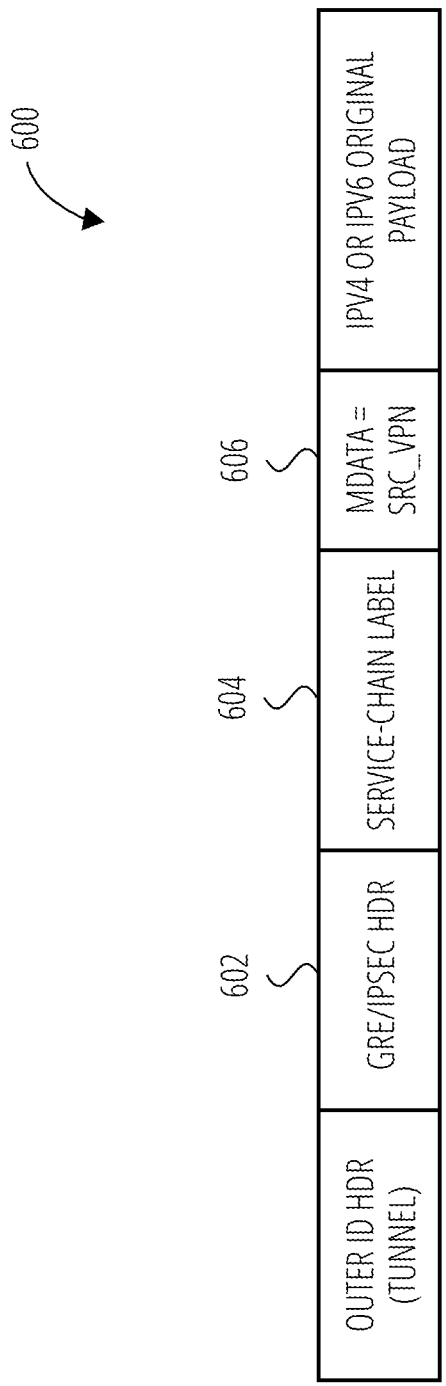
FIG. 6 illustrates an example data packet layout in accordance with some embodiments of the present technology.

FIG. 6 shows a sample packet format for a data packet 600 that can be carried between the source branch 502 (FIG. 5) and the hub node 506 with information about the source VPN being carried within metadata 514 of the data packet 600. The data packet 600 can include packet tuple info 602 (e.g., present within a GRE/IPSec header), service chain info 604 (e.g., as a "service-chain label", VPN segment Info 606 (e.g., as "MDATA=SRC_VPN"). The hub node 506 can use this information to extract flow information (e.g., flow information 522) for the data packet 600. For transmitting the data packet 512 to the service chain element 510 over the Service Chain VPN segment 526, the hub may remove the VPN segment Info 606 about the source VPN segment (e.g., first VPN segment 524) before sending forward to the service chain element 510. In some examples, the hub can re-format or otherwise update the header of the (outgoing) data packet to be suitable for handling by the service chain element 510.

Figure 7:
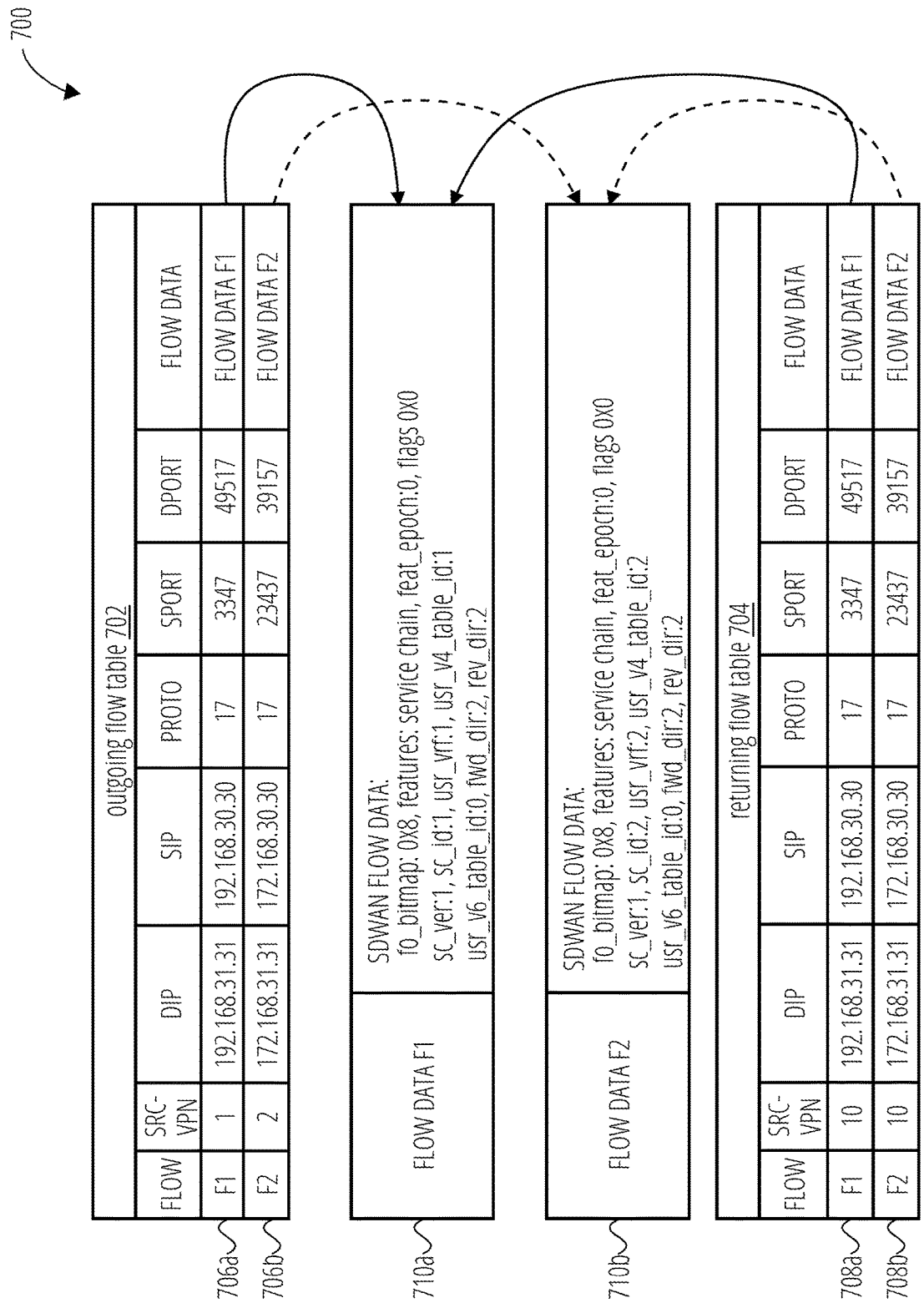
FIG. 7 illustrates example flow table entries in accordance with some embodiments of the present technology.

FIG. 7 is a diagram 700 showing example flow tables and flow information entries that may be recorded within the flow table (e.g., flow table 508) by the hub node 506. In particular, FIG. 7 shows an outgoing flow table 702 that shows a first outgoing flow table entry 706a and a second outgoing flow table entry 706b, and a returning flow table 704 that shows a first returning flow table entry 708a and a second returning flow table entry 708b.

The outgoing flow table 702 includes packet tuple information for data packets (e.g., data packets 512) associated with each respective flow that the hub node 506 receives from the source branch 502 over a source VPN segment (e.g., first VPN segment 524) and that need to be sent to the service chain element 510 over the Service Chain VPN segment 526. The packet tuple information can include, but is not limited to: flow identifiers, source VPN info (SRC-VPN), a destination IP address (DIP), a source IP address (SIP), source and destination port information (SPORT and DPORT), and flow information. The source VPN info within the outgoing flow table 704 denotes the VPN segment (e.g., VPN1 or VPN2) that originated the data packet.

In the example, the first outgoing flow table entry 706a includes first flow information 710a (flow data for F1) about a first flow (F1) associated with a first VPN segment 524 (e.g., source VPN1). The second outgoing flow table entry 706b includes second flow information 710b (flow data for F2) about a second flow (F2) associated with a second VPN segment (e.g., source VPN2). The first flow (F1) and the second flow (F2) can each be assigned to separate VPN segments associated with the same source branch (e.g., source branch 502) or associated with different source branches.

The returning flow table 704 includes packet tuple info for (returning) data packets associated with each respective flow that the hub node 506 receives back from the service chain element 510 (e.g., over the Service Chain VPN segment 526) and that need to be sent onward to the destination branch over the appropriate VPN segment. Likewise, the packet tuple information can include: flow identifiers, source VPN information (SRC-VPN), a destination IP address (DIP), a source IP address (SIP), source and destination port information (SPORT and DPORT), and flow information. Notably, the source VPN information within the returning flow table 704 denotes the service chain VPN segment (e.g., VPN10).

The first returning flow table entry 708a also includes first flow information 710a (flow data F1, also recorded within the first outgoing flow table entry 706a) about the first flow (F1) as associated with the Service Chain VPN segment 526. Likewise, the second returning flow table entry 708b includes second flow information 710b (flow data F2, also recorded within the second outgoing flow table entry 706b) about the second flow (F2) as associated with the Service Chain VPN segment 526 (e.g., SRC-VPN 10). The first flow (F1) and the second flow (F2) can be assigned to separate VPN segments associated with the same destination branch (e.g., destination branch 504) or associated with different destination branches.

To identify a flow that a data packet received back from the service chain element 510 belongs to, the hub node 506 can match the packet tuple info within the returning flow table 704 with the packet tuple info within the outgoing flow table 702 to find entries within the flow table 508 that correspond with the packet tuple info of the returning data packet. Based on flow information obtained from the flow table 508 and the packet tuple info associated with the flow that the data packet belongs to, the hub node 506 retrieves the VPN segment Info for the appropriate VPN segment. The hub node 506 can then forward the data packet onward to the destination branch over the appropriate VPN segment.

FIG. 7 also shows example entries for the first flow information 710a and the second flow information 710b. As shown, the first flow information 710a is the same for both the first outgoing flow table entry 706a and the first returning flow table entry 708a, which belong to the same flow (first flow F1). Likewise, the second flow information 710b is the same for both the second outgoing flow table entry 706b and the second returning flow table entry 708b, which belong to the same flow (second flow F2).

TABLE 1

```
vm40#show platform hardware qfp active flow fos-to-print all
++++++++++++++++++++++++++++++++++++++++++++++++++++++++++++++++++
      GLOBAL CFT ~ Max Flows:25600 Buckets Num:0
++++++++++++++++++++++++++++++++++++++++++++++++++++++++++++++++++
Filtering parameters:
     IP1 : ANY
     Port1 : ANY
     IP2 : ANY
     Port2 : ANY
     Vrf id : ANY
     Application: ANY
     TC id: ANY
     DST Interface id: ANY
     L3 protocol : IPV4/IPV6
     L4 protocol : TCP/UDP/ICMP/ICMPV6
     Flow type : ANY
Output parameters:
     Print CFT internal data ? No
     Only print summary ? No
     Asymmetric : ANY
++++++++++++++++++++++++++++++++++++++++++++++++++++++++++++++++++
keyID: SrcIP SrcPort DstIP DstPort L3-Protocol L4-Protocol vrfID
==================================================================
   key #0: 192.168.31.31 33437 192.168.30.30 49157 IPv4 UDP 4
   key #1: 192.168.30.30 49157 192.168.31.31 33437 IPv4 UDP 4
   key #2: 192.168.31.31 33437 192.168.30.30 49157 IPv4 UDP 3
   key #3: 192.168.30.30 49157 192.168.31.31 33437 IPv4 UDP 3
Data for FO with id: 0
------------------------
SDWAN Flow data:
fo_bitmap:0x8,Features:Service Chain, feat_epoch:0, flags:0x0
sc_ver:1, sc_id:1, usr_vrf: 1, usr_v4_table_id: 1, usr_v6_table_id: 0, fwd_dir: 2, rev_dir: 2
```

Multiple data packets can belong to the same flow. Upon receipt of a data packet that indicates a new flow (e.g., a flow that has not been previously recorded within the flow table 508), the hub node 506 creates a new entry with flow information for the data packet. For subsequent data packets belonging to the same flow, the hub node 506 recognizes that they belong to the same flow and will associate each subsequent data packet with this flow.

Figure 8A:
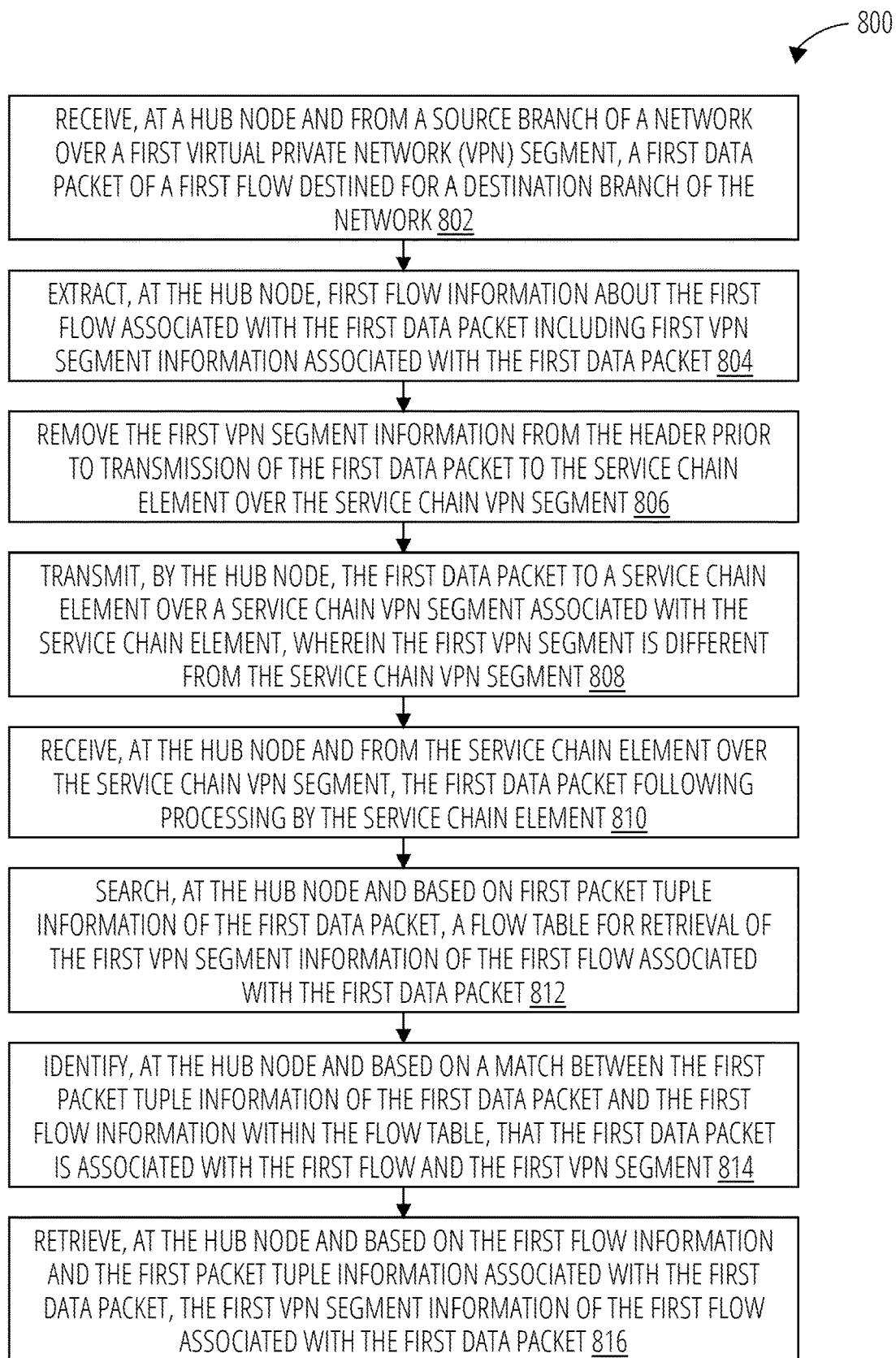
FIG. 8A illustrates a routine in accordance with some embodiments of the present technology.

FIG. 8A and FIG. 8B show a routine 800 for facilitating communication over an SD-WAN with service chaining and VPN segment preservation. In block 802, Routine 800 receives, at a hub node and from a source branch of a network over a first Virtual Private Network (VPN) segment, a first data packet of a first flow destined for a destination branch of the network. In block 804, Routine 800 extracts, at the hub node, first flow information about the first flow associated with the first data packet including first VPN segment information associated with the first data packet. In block 806, Routine 800 removes the first VPN segment information from the header prior to transmission of the first data packet to the service chain element over the service chain VPN segment. In block 808, Routine 800 transmits, by the hub node, the first data packet to a service chain element over a service chain VPN segment associated with the service chain element, wherein the first VPN segment is different from the service chain VPN segment. In block 810, Routine 800 receives, at the hub node and from the service chain element over the service chain VPN segment, the first data packet following processing by the service chain element. In block 812, Routine 800 searches, at the hub node and based on the first packet tuple information of the first data packet, a flow table for retrieval of the first VPN segment information of the first flow associated with the first data packet. In block 814, Routine 800 identifies, at the hub node and based on a match between the first packet tuple information of the first data packet and the first flow information within the flow table, that the first data packet is associated with the first flow and the first VPN segment. In block 816, routine 800 retrieves, at the hub node and based on the first flow information and the first packet tuple information associated with the first data packet, the first VPN segment information of the first flow associated with the first data packet. Routine 800 continues as shown in FIG. 8B.

In block 818, Routine 800 transmits, by the hub node, the first data packet to the destination branch over the first VPN segment based on the first packet tuple information and the first VPN segment information associated with the first data packet. In block 820, Routine 800 receives, at the hub node and from the source branch of the network over the first VPN segment, a second data packet of the first flow destined for the destination branch of the network, the second data packet including second metadata that corresponds with first metadata of the first data packet. In block 822, Routine 800 determines, upon receipt of the second data packet at the hub node from the source branch, that the second data packet belongs to the first flow based on the second metadata of the second data packet. In block 824, routine 800 associates, at the hub node and based on the second metadata of the second data packet, the second data packet with the first flow information. In block 826, routine 800 transmits, by the hub node, the second data packet to the service chain element over the service chain VPN segment.

Automatic Service Chaining for Bidirectional Flows

Service chaining is usually required in both directions of a flow. This is done by complex policy and routing configurations in both directions. However, there is a need to enforce bidirectional service chaining intent—such as "I want social media traffic to get firewalled" as a traffic policy match-action sequence, and be assured that both directions will get firewalled automatically without additional policy or routing configuration.

Figure 9:
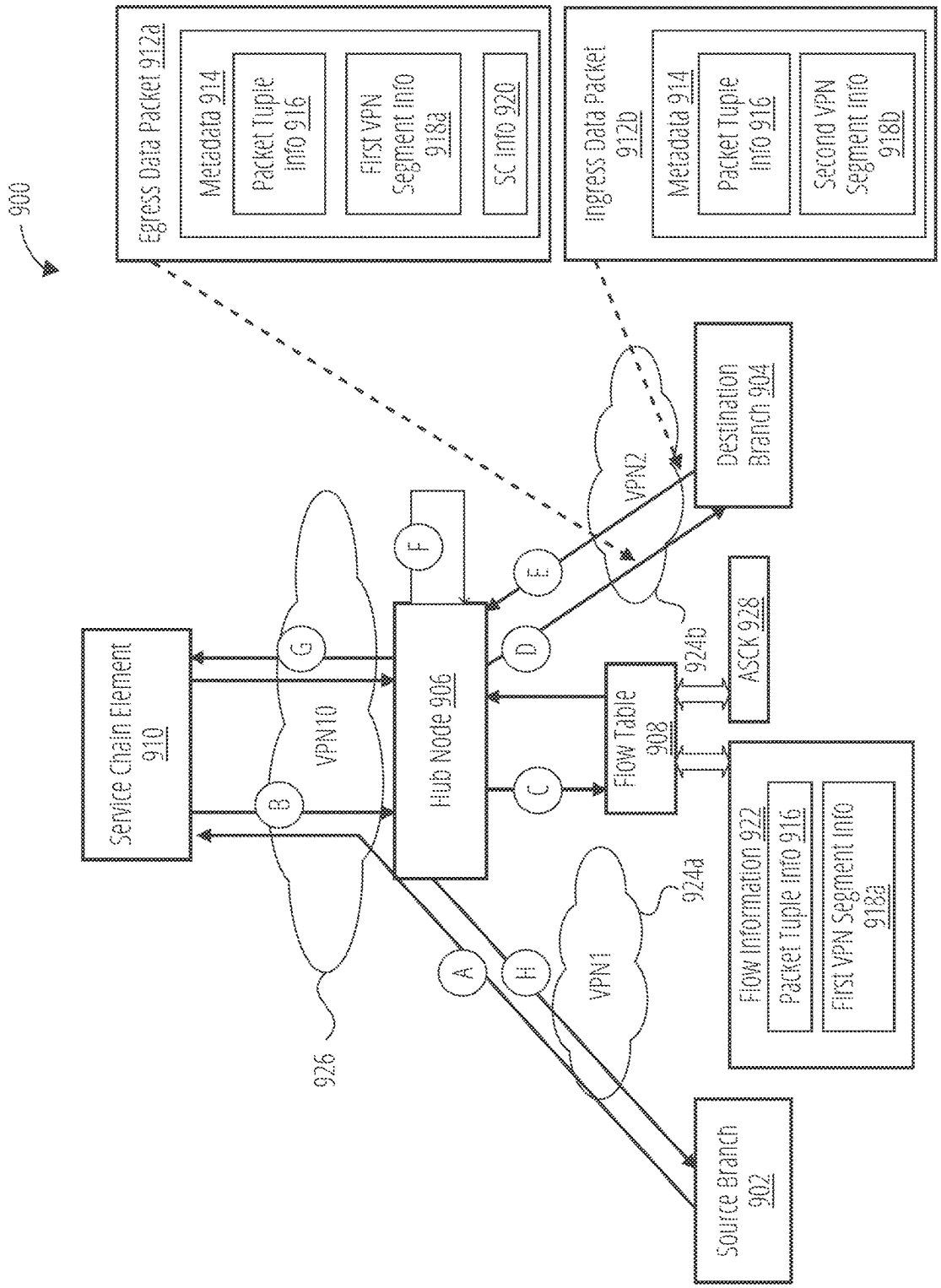
FIG. 9 illustrates an example of a diagram showing the operation of virtual private networks for automatically service-chaining bi-directional traffic in accordance with some embodiments of the present technology.
Figure 10:
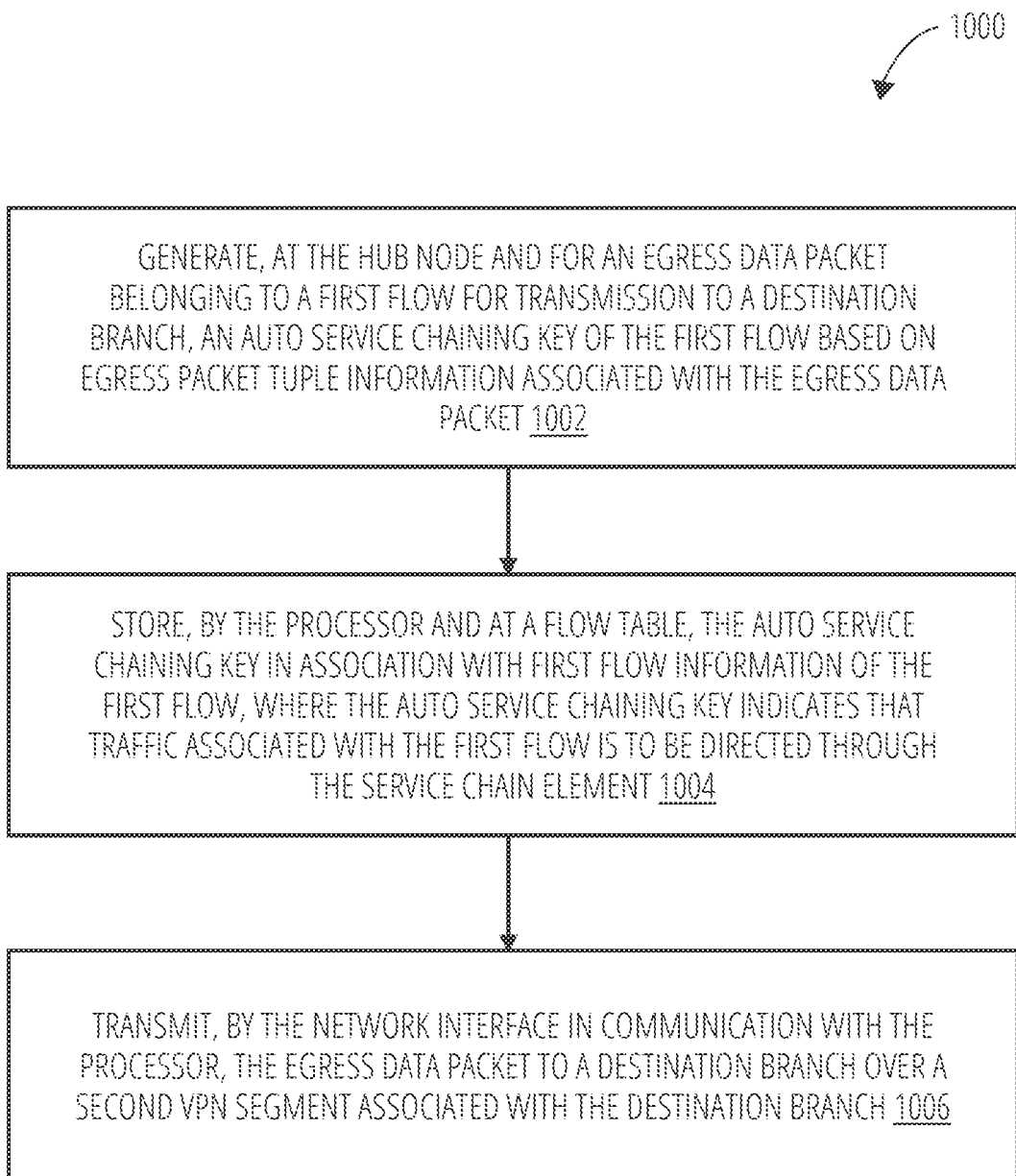
FIG. 10 illustrates an "egress" routine in accordance with some embodiments of the present technology, particularly with respect to FIG. 9.
Figure 11:
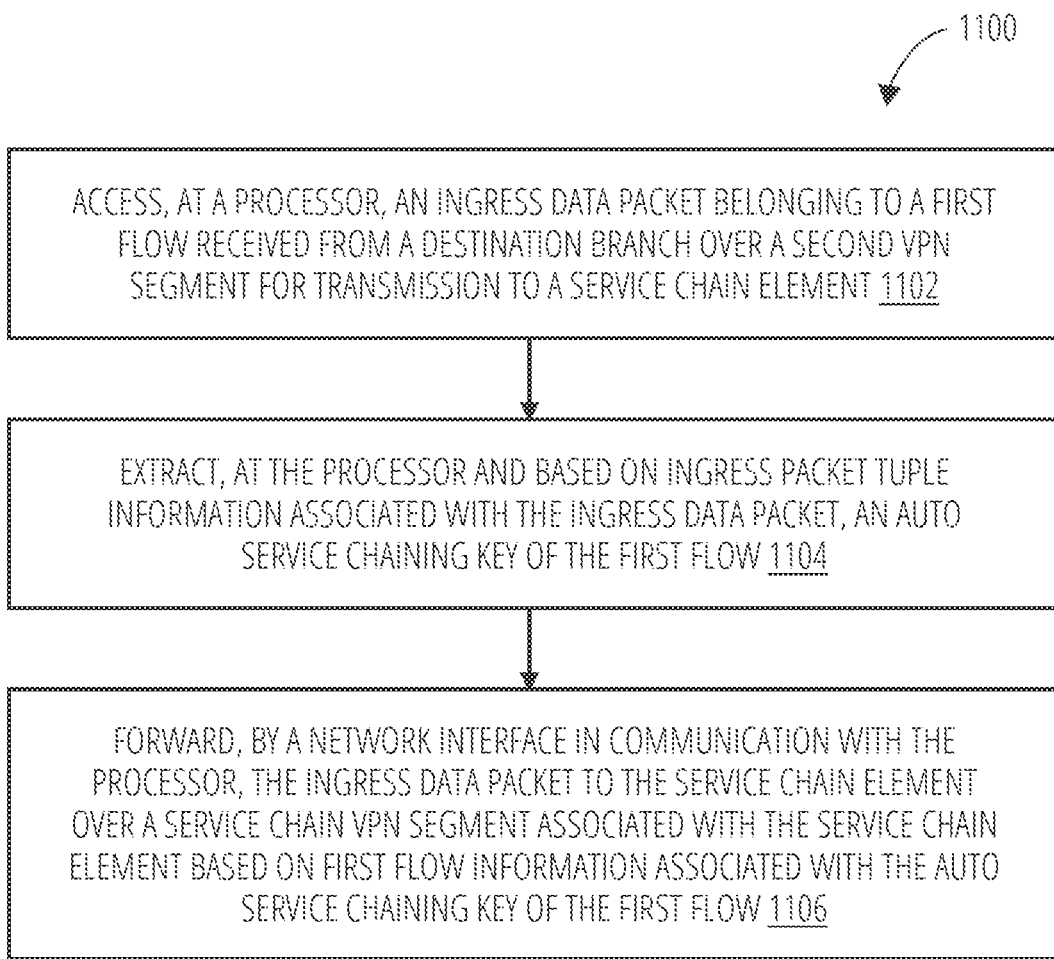
FIG. 11 illustrates an "ingress" routine in accordance with some embodiments of the present technology, particularly with respect to FIG. 9.

While the systems and methods outlined with respect to FIGS. 5-8B allow sources in different VPNs to share a single service chain VPN, these strategies do not necessarily accommodate traffic in a reverse direction. To address this, FIGS. 9-11 show a system and associated methods for automatically service-chaining both forward and reverse traffic of a flow while only requiring a forward direction policy to be specified. The systems and methods in FIGS. 9-11 also allow 3 VPNs (e.g., source-VPN, SC-VPN, destination-VPN) to be different.

In this context, transit traffic is traffic that is egressing out of a user-VPN (e.g., a first VPN segment) in an SDWAN router (as opposed to traffic that egresses out through another SDWAN tunnel). This traffic might have ingressed into the SDWAN router through an SDWAN tunnel or a user-VPN (ingress user-VPN can be same or different from egress user-VPN). Usually this is traffic of two kinds:
- Traffic headed towards a SaaS through a secure interface available only in an enterprise hub.
- Traffic headed towards an enterprise cloud workload through a middle mile provider (e.g., Software Defined Cloud Interconnect (SDCI)) or a Cloud Gateway (CGW). In this case, SDWAN routers form the SDCI gateway or the CGW.

In Service Chain deployment, there can be a destination branch hosting or facilitating Software as a Service (SaaS) or another type of destination hosted behind the hub node. In a diagram 900 shown in FIG. 9, a source branch 902 and hub node 906 are SDWAN routers and the source branch 902 may be associated with a user device. For any traffic from source branch 902 to an SaaS Application at destination branch 904, a user wants this traffic to undergo service-chaining upon reaching the hub node 906 and before forwarding to the destination branch. The hub node 906 forwards the traffic to a service chain element 910, which applies one or more service-chaining operations and sends the (now service-chained) traffic back to the hub node 906. The hub node 906 receives this traffic from the service chain element 910, and must forward the traffic onward to the destination branch 904. In the context of the present disclosure, service-chained packets belonging to a flow that the hub node 906 forwards to the destination branch 904 are referred to herein as egress data packets 912a, which egress to the destination branch 904 from the hub node 906. With current solutions, this can be accomplished by a remote branch policy at the source branch 902 or a colocated policy at the hub node 906. In the context of the present disclosure, packets belonging to "return traffic" for the same flow that the hub node 906 receives in the reverse direction from the destination branch 904 are referred to herein as ingress data packets 912b, which ingress to the hub node 906 from the destination branch 904. However, to service-chain the ingress data packets 912b that require service-chaining before forwarding towards the source branch 902, there are two problems.

1. User is forced to configure a new colocated policy at the hub node 906 as there is no identifying metadata in an ingress data packet that says it needs to be service chained.
2. In case of certain "match criteria" applications, it is difficult to differentiate which traffic needs to be service chained. For example, consider 2 flows from the same source branch 902, where flow 1 to destination branch 904 (SaaS) may be service-chained but flow2 to the same destination branch 904 does not need to be service-chained. Creating a policy to achieve this differentiation in the return direction can be difficult because of the large number and complexity of sequences that need to be maintained, and also because the interface to destination branch 904 (SaaS) is shared across all sources.

As such, the systems and methods discussed with reference to FIGS. 9-11 provide a way to solve the above two problems and enable auto-service-chaining traffic that needs to be service-chained and reserving service-chaining resources for such traffic. Steps (1)-(3) discussed below describe relevant steps of service-chain infrastructure, followed by additions to the service-chain infrastructure presented herein.

(1) The hub node 906 receives traffic belonging to a first flow from the source branch 902 that needs service-chaining before forwarding to the destination branch 904. The hub node 906 uses a service chain ID to forward the traffic through the service chain element 910. If the traffic is from a local user-VPN segment, the service chain ID is obtained from a policy match action. If the traffic is from a user-VPN segment at a remote site, the service chain ID is obtained from an SDWAN label within packet metadata (e.g., metadata 914, which can include packet tuple info 916). The hub node 906 creates a flow entry in the flow table 908 for the user-VPN segment (e.g., first VPN segment 924a) and associates a service-chain feature object (e.g., SC info 920) with the flow entry. Along with other service-chain feature object data, the Service Chain ID is also stored by the hub node 906 before re-directing the traffic onward to the service chain element 910 over a service chain (SC) VPN segment 926.

(2) For traffic returning to the hub node 906 from the service chain element 910, the hub node 906 searches for the relevant flow within the flow table 908 to retrieve VPN segment information (e.g., first VPN segment information 918a). The hub node 906 forwards the traffic the original user-VPN. In some embodiments, information about the destination branch 904 (e.g., the SaaS or another destination) would have been "leaked" into the original user-VPN (or may be provided using the systems and methods outlined above with reference to FIGS. 5-8B).

(3) The hub node 906 forwards traffic (e.g., egress data packet(s) 912a) belonging to the first flow onward to the destination branch 904 over o a VPN segment (e.g., second VPN segment 924b) associated with the destination branch 904 (e.g., where the SaaS or other destination is located).

The systems and methods outlined herein with respect to FIGS. 9-11 expand upon this infrastructure in the following manner:

Before step (3) addressed above where the hub node 906 forwards the egress data packet(s) 912a onward to the destination branch 904 (e.g., the SaaS), the hub node 906 generates and stores an Auto Service Chaining Key (ASCK) 928 for the egress data packet(s) 912a egressing out of the hub node 906 and towards the destination branch 904. The ASCK 928 points to the first flow whose information is present within the flow table 908 and can be used to match returning traffic to the first flow (e.g., ingress data packets 912b that belong to the first flow that are ingressing to the hub node 906 from the destination branch 904). The ASCK 928 can be of the format {5 tuple+dest-VPN} where an "src-VPN" field is replaced by a "dest-VPN" which is the VPN segment in which the destination branch 904 (e.g., the SaaS) is reachable (e.g., second VPN segment 924b). 3 keys within the flow table 908 will be pointing to the same flow entry.

The ASCK 928 is used so that when the ingress data packet(s) 912b for the same flow is received at the hub node 906 from the destination branch 904 (SaaS), instead of doing a destination route lookup, the hub node 906 re-creates the ASCK 928 from information within the ingress data packet(s) 912b and uses the ASCK 928 to perform a flow lookup. The hub node 906 can find that the egress data packet(s) 912a for the same flow egressed from the hub node 906 and towards the destination branch 904 were service-chained, so the ingress data packet(s) 912b ingressing into the hub node 906 from destination branch 904 must also be service-chained. The flow lookup will also reveal the Service Chain ID because the flow entry result is the same as the one used for traffic to-and-from the service chain element 910.

An Auto-Service-Chaining flow information association can be installed on every SaaS-facing interface (including hub node 906). This interface can be identified by new configuration, an example of which is shown below. Users can do this configuration for every SaaS facing interface where this behavior is desired:

interface gigabitethernet 0/1
sdwan auto-service-chaining

A. Traffic Flow from Source Branch Towards Destination Node

Steps (A)-(D) below correspond with circles (A)-(D) of FIG. 9:

A) Traffic destined for the destination branch 904 arrives at hub node 906 from source branch 902, but must be Service-Chained first. The hub node 906 creates a common flow entry for the flow with the original user-VPN (e.g., first VPN segment 924a) in key to lookup in reverse direction as shown in the flow table 908. First VPN segment info 918a and Service Chain ID (SCID) (e.g., SC info 920) are stored within the flow information 922 of the flow table 908. The traffic is then redirected to the service chain element 910 over SC VPN segment 926.

B) The hub node 906 receives the traffic back from service chain element 910.

C) Hub node 906 performs a flow lookup for the flow information 922 at the flow table 908 based on packet tuple information 916 of the traffic, revealing original user-VPN (first VPN segment 924a). The hub node 906 can identify final destination VPN (e.g., second VPN segment 924b) after route lookup in the user-VPN. The hub node 906 then creates and stores the ASCK 928 that includes information about second VPN segment 924b and points to the same flow entry in the flow table 908.

D) The hub node 906 then forwards egress data packet 912a onward to destination branch 904 over second VPN segment 924b.

B. Return Traffic Flow from Destination Branch 904 (SaaS) Towards Source Branch 902

Steps (E)-(H) below correspond with circles (E)-(H) of FIG. 9:

E) Ingress data packet 912b from the SaaS app (destination branch 904) returns to the hub node 906, which re-creates the ASCK 928 from packet tuple info 916 of the ingress data packet 912b and VPN segment information 918b (for the SaaS VPN, second VPN segment 924b).

F) Hub node 906 performs flow lookup with the ASCK 928 in the flow table 908. This will match the flow information 922 in the flow table 908 because of step (C) in the "forward" direction above.

G) Since the flow lookup was successful and the flow information 922 has the Service Chain feature data with valid Service Chain ID, this means that the egress data packet 912a was service chained and now the ingress data packet 912b has to be service chained too. The hub node 906 forwards the ingress data packet 912b to the service chain element 910 over SC VPN 926.

H) The hub node 906 receives and forwards the return traffic for the flow that has now been service-chained back to source branch 902.

Auto Service-Chaining Routines

FIGS. 10 and 11 elaborate on the above-outlined process for accommodating service-chaining needs for both egress (routine 1000 of FIG. 10) and ingress (routine 1100 of FIG. 11) data packets of the same flow sent between three VPN segments, including a first VPN segment associated with the source branch, a second VPN segment associated with the destination branch, and the service chain VPN segment (e.g., VPN10 or "SC VPN segment").

Egress Routine

At block 1002 of routine 1000, the hub node generates, for an egress data packet belonging to a first flow for transmission to a destination branch, an Auto Service Chaining Key of the first flow based on egress packet tuple information associated with the egress data packet. The egress data packet is associated with forward traffic of the first flow that flows from a source branch to the destination branch, and has been subjected to service-chaining prior to generation of the Auto Service Chaining Key. In this example, the destination branch can include an edge network device implementing or otherwise facilitating a Software as a Service (SaaS) process over the second VPN segment. The Auto Service Chaining Key includes second VPN segment information of the second VPN segment associated with the destination branch.

At block 1004 of routine 1000, the hub node stores, by the hub node and at a flow table, the Auto Service Chaining Key in association with first flow information of the first flow. The Auto Service Chaining Key indicates that traffic associated with the first flow is to be directed through the service chain element. This information enables the hub node to recognize packets of the first flow that are traveling in the reverse direction.

At block 1006 of routine 1000 the hub node transmits, by a network interface in communication with the processor, the egress data packet to the destination branch over the second VPN segment associated with the destination branch.

Ingress Routine

At block 1102 of routine 1100, the hub node receives, at the hub node and from the destination branch over the second VPN segment, an ingress data packet belonging to the first flow for transmission to the service chain element. The ingress data packet is associated with return traffic of the first flow that flows from the destination branch to the source branch.

At block 1104 of routine 1100, the hub node extracts or otherwise recreates, based on ingress packet tuple information associated with the ingress data packet, the Auto Service Chaining Key of the first flow. The hub node uses the Auto Service Chaining Key to retrieve the first flow information from the flow table, which should match the first flow information and second VPN segment information discussed with respect to block 1004 of routine 1000 of FIG. 10 regarding the egress data packet. The Auto Service Chaining Key connects ingress packet tuple information associated with the ingress data packet and second VPN segment information of the second VPN segment associated with the destination branch with the first flow information present within the flow table. If flow retrieval is successful and the flow entry has feature data associated with the service chain with a valid service chain ID, then this means that the corresponding egress data packet that went towards the destination node was service-chained and the ingress data packet going towards the source node should also be service-chained.

At block 1106 of routine 1100, the hub node forwards the ingress data packet to the service chain element over a service chain VPN segment associated with the service chain element based on first flow information associated with the Auto Service Chaining Key of the first flow.

The hub node can receive (now service-chained) return traffic from the service chain element, and forward the return traffic onward to the source branch over the first VPN segment associated with the source branch.

Network Device(s) and Computing System

Figure 12:
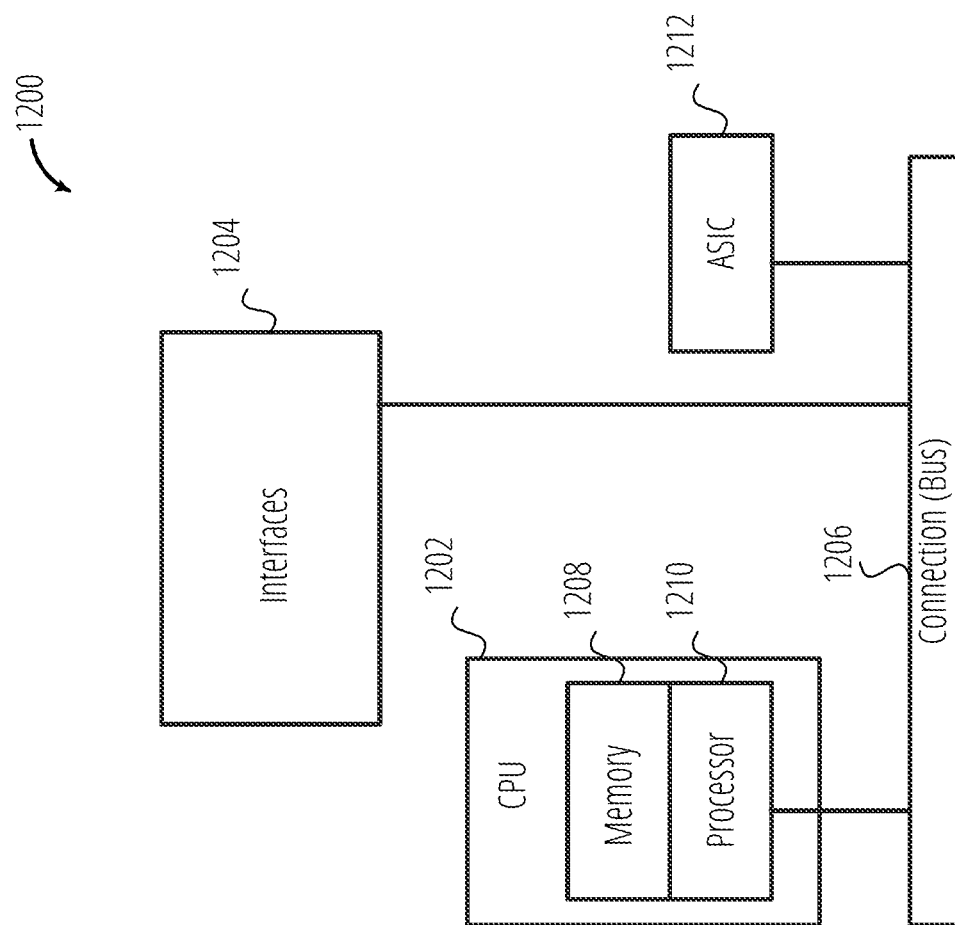
FIG. 12 illustrates an example network device in accordance with some embodiments of the present technology.

FIG. 12 illustrates an example network device 1200 suitable for performing switching, routing, load balancing, and other networking operations. The example network device 1200 can be implemented as switches, routers (e.g., edge network devices 132), nodes (e.g., hub node 506), metadata servers, load balancers, client devices, and so forth.

Network device 1200 includes a central processing unit (CPU 1202), interface(s) 1204, and a bus connection 1206 (e.g., a PCI bus). When acting under the control of appropriate software or firmware, the CPU 1202 is responsible for executing packet management, error detection, and/or routing functions. The CPU 1202 preferably accomplishes all these functions under the control of software including an operating system and any appropriate applications software. CPU 1202 may include one or more processors 1210, such as a processor from the INTEL X86 family of microprocessors. In some cases, processor 1210 can be specially designed hardware for controlling the operations of network device 1200. In some cases, a memory 1208 (e.g., non-volatile RAM, ROM, etc.) also forms part of CPU 1202. However, there are many different ways in which memory 1208 could be coupled to the system.

The interface(s) 1204 are typically provided as modular interface cards (sometimes referred to as "line cards"). Generally, they control the sending and receiving of data packets over the network and sometimes support other peripherals used with the network device 1200. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., CPU 1202) to efficiently perform routing computations, network diagnostics, security functions, etc.

Although the system shown in FIG. 12 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 1200.

Regardless of the network device's configuration, it may employ one or more memories or memory modules (including memory 1208) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1208 could also hold various software containers and virtualized execution environments and data. Memory 1208 can also include instructions for executing aspects of routine 800 outlined herein with respect to FIGS. 8A and 8B, routine 1000 of FIG. 10 and/or routine 1100 of FIG. 11.

The network device 1200 can also include an application-specific integrated circuit (ASIC) 1212, which can be configured to perform routing and/or switching operations. The ASIC 1212 can communicate with other components in the network device 1200 via the bus connection 1206, to exchange data and signals and coordinate various types of operations by the network device 1200, such as routing, switching, and/or data storage operations, for example.

Figure 13:
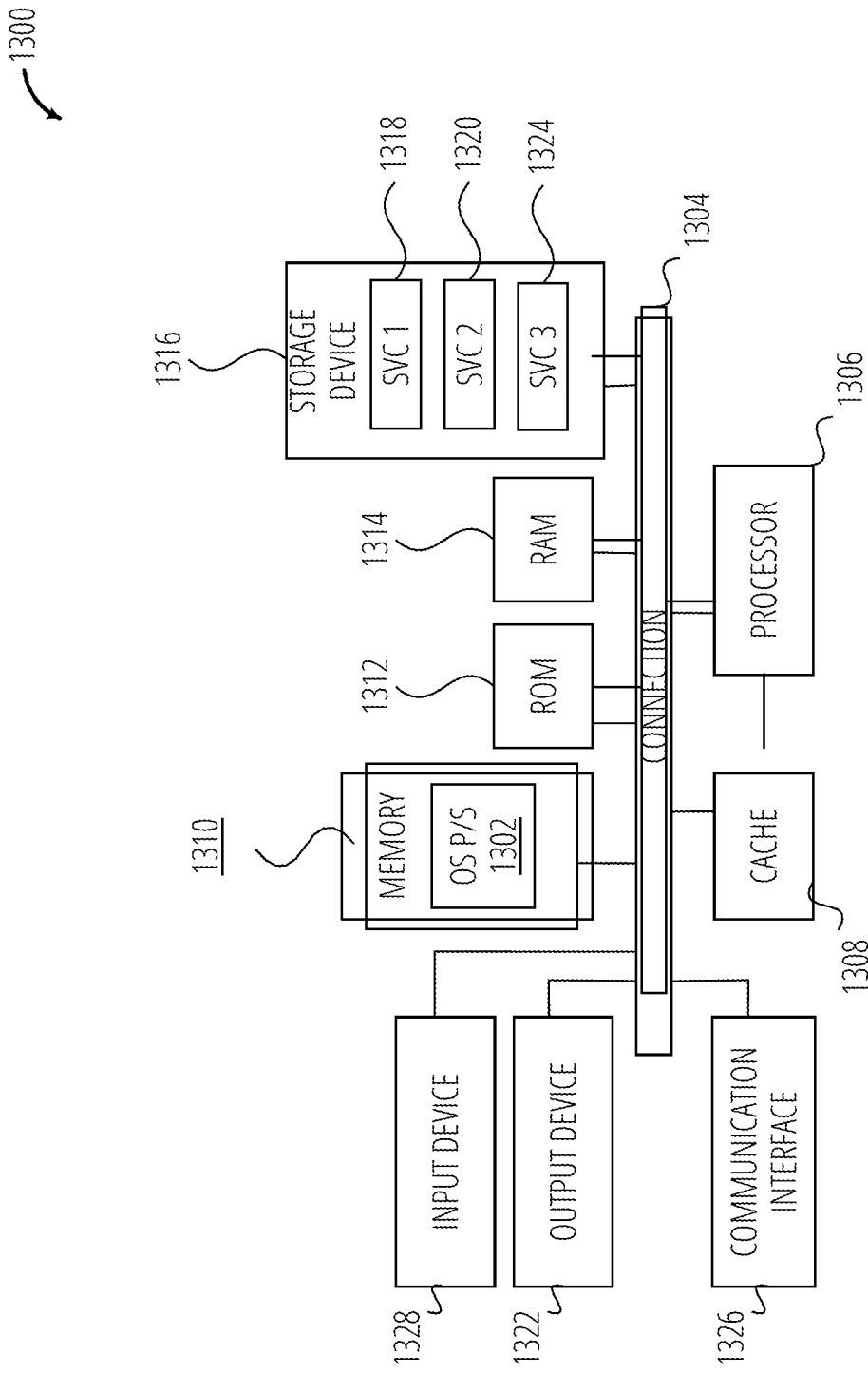
FIG. 13 shows an example of computing system, which can be for example any computing device that can implement components of the system in accordance with some embodiments of the present technology.

FIG. 13 shows an example of computing system 1300, which can be for example any computing device for assisting with the functionalities of network devices (e.g., such as managing and storing information within routing tables) or any component thereof in which the components of the system are in communication with each other using connection 1304. Connection 1304 can be a physical connection via a bus, or a direct connection into processor 1306, such as in a chipset architecture. Connection 1304 can also be a virtual connection, networked connection, or logical connection.

In some embodiments computing system 1300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1306 and connection 1304 that couples various system components including system memory 1310 which can include operating system processes/services 1302 embodied thereon, such as read only memory (ROM) 1312 and random access memory (RAM) 1314 to processor 1306. Computing system 1300 can include a cache 1308 of high-speed memory connected directly with, in close proximity to, or integrated as part of processor 1306.

Processor 1306 can include any general purpose processor and a hardware service or software service, such as services 1318, 1320, and 1324 stored in storage device 1316, configured to control processor 1306 as well as a special-purpose processor where software instructions are incorporated into the actual processor design. Processor 1306 may essentially be a completely self-contained computing system, containing multiple cores or processors, a bus, memory controller, cache, etc. A multi-core processor may be symmetric or asymmetric.

To enable user interaction, computing system 1300 includes an input device 1328, which can represent any number of input mechanisms, such as a microphone for speech, a touch-sensitive screen for gesture or graphical input, keyboard, mouse, motion input, speech, etc. Computing system 1300 can also include output device 1322, which can be one or more of a number of output mechanisms known to those of skill in the art. In some instances, multimodal systems can enable a user to provide multiple types of input/output to communicate with computing system 1300. Computing system 1300 can include communication interface 1326, which can generally govern and manage the user input and system output. There is no restriction on operating on any particular hardware arrangement and therefore the basic features here may easily be substituted for improved hardware or firmware arrangements as they are developed.

Storage device 1316 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1316 can include software services, servers, services, etc., that when the code that defines such software is executed by the processor 1306, it causes the system to perform a function. In some embodiments, a hardware service that performs a particular function can include the software component stored in a computer-readable medium in connection with the necessary hardware components, such as processor 1306, connection 1304, output device 1322, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:
    receiving, at a hub node and from a source branch over a first Virtual Private Network (VPN) segment, a first data packet of a first flow destined for a destination branch;
    extracting, at the hub node from the first data packet, first flow information about the first flow, wherein the first flow information includes first VPN segment information and first packet tuple information associated with the first data packet;
    transmitting, by the hub node, the first data packet to a service chain element over a service chain VPN segment associated with the service chain element, wherein the first VPN segment is different from the service chain VPN segment;
    receiving, at the hub node and from the service chain element over the service chain VPN segment, the first data packet after the first data packet was processed by the service chain element;
    retrieving, at the hub node and based on the first packet tuple information associated with the first data packet, the first VPN segment information of the first flow associated with the first VPN segment; and
    transmitting, by the hub node, the first data packet to the destination branch over the first VPN segment based on the first VPN segment information.

2. The method of claim 1, the first data packet including a header including first metadata, the first metadata including the first VPN segment information that indicates the first VPN segment and the first packet tuple information for the first data packet, the method further comprising:
    removing the first VPN segment information from the header prior to transmission of the first data packet to the service chain element over the service chain VPN segment.

3. The method of claim 1, further comprising:
    searching, at the hub node and based on the first packet tuple information of the first data packet, a flow table for retrieval of the first VPN segment information of the first flow associated with the first data packet,
    wherein the flow table includes the first flow information extracted by the hub node and associates the first packet tuple information of the first data packet with the first flow information.

4. The method of claim 3, further comprising:
    identifying, at the hub node and based on a match between the first packet tuple information of the first data packet and the first flow information within the flow table, that the first data packet is associated with the first flow and the first VPN segment.

5. The method of claim 1, further comprising:
    identifying, at the hub node and based on service chain information of the first data packet, that the first data packet is to be transmitted to the service chain element over the service chain VPN segment.

6. The method of claim 1, further comprising:
    receiving, at the hub node and from the source branch over the first VPN segment, a second data packet of the first flow destined for the destination branch, the second data packet including second metadata that corresponds with first metadata of the first data packet;
    associating, at the hub node and based on the second metadata of the second data packet, the second data packet with the first flow information; and
    transmitting, by the hub node, the second data packet to the service chain element over the service chain VPN segment.

7. The method of claim 6, further comprising:
    determining, upon receipt of the second data packet at the hub node from the source branch, that the second data packet belongs to the first flow based on the second metadata of the second data packet.

8. The method of claim 1, further comprising:
    receiving, at the hub node and from the source branch over a second VPN segment, a second data packet of a second flow destined for a second destination branch, the second flow being different from the first flow;
    extracting, at the hub node, second flow information about the second flow associated with the second data packet including second VPN segment information associated with the second data packet;
    the second flow information about the second data packet including second packet tuple information associated with the second data packet; and
    transmitting, by the hub node, the second data packet to the service chain element over the service chain VPN segment, wherein the second VPN segment is different from the service chain VPN segment.

9. The method of claim 8, further comprising:
receiving, at the hub node and from the service chain element over the service chain VPN segment, the second data packet following processing by the service chain element;
retrieving, at the hub node and based on the second packet tuple information associated with the second data packet, the second VPN segment information of the second flow associated with the second data packet; and
transmitting, by the hub node, the second data packet to the destination branch over the second VPN segment based on the second VPN segment information associated with the second data packet.

10. A method, comprising:
receiving, at a hub node and over a service chain VPN segment, a first data packet from and processed by a service chain element, wherein the first data packet belongs to a first flow, and wherein the first data packet was previously received by the hub from a source branch over a first Virtual Private Network (VPN) segment;
searching, at the hub node and based on first packet tuple information associated with the first data packet, a flow table for retrieval of first flow information including first VPN segment information associated with the first VPN segment;
retrieving, at the hub node and based on the first packet tuple information, the first flow information from the flow table including the first VPN segment information; and
transmitting, by the hub node, the first data packet to a destination branch over the first VPN segment based on the first packet tuple information and the first VPN segment information, wherein the first VPN segment is different from the service chain VPN segment.

11. The method of claim 10, where the hub node receives the first data packet from a source branch over the first VPN segment and where the first flow information is not present within the flow table, the method further comprising:
extracting, at the hub node, the first flow information from the first data packet including the first VPN segment information and the first packet tuple information from the first data packet;
storing, by the hub node, the first flow information at the flow table; and
transmitting, by the hub node, the first data packet to the service chain element over the service chain VPN segment associated with the service chain element, wherein the first VPN segment is different from the service chain VPN segment.

12. The method of claim 10, where the hub node receives the first data packet from a source branch over the first VPN segment and where the first flow information is present within the flow table, the method further comprising:
associating, at the hub node, the first flow information from the flow table with the first data packet including the first VPN segment information and the first packet tuple information associated with the first data packet; and
transmitting, by the hub node, the first data packet to the service chain element over the service chain VPN segment associated with the service chain element, wherein the first VPN segment is different from the service chain VPN segment.

13. A system, comprising:
a hub node of a network, the hub node including a processor in communication with a memory and a network interface, the memory including instructions executable by the processor to:
access, at the processor and over the network interface from a service chain VPN segment, a first data packet from and processed by a service chain element, wherein the first data packet belongs to a first flow, and wherein the first data packet was previously received by the hub node from a source branch over a first Virtual Private Network (VPN) segment;
search, at the processor and based on first packet tuple information associated with the first data packet, a flow table for retrieval of first flow information including first VPN segment information associated with the first VPN segment, the memory of the hub node including instructions executable by the processor to:
retrieve, at the processor and based on the first packet tuple information, the first flow information from the flow table including the first VPN segment information; and
transmit, over the network interface, the first data packet to a destination branch over the first VPN segment based on the first packet tuple information and the first VPN segment information, wherein the first VPN segment is different from the service chain VPN segment.

14. The system of claim 13, where the network interface of the hub node receives the first data packet from the source branch over the first VPN segment and where the first flow information is not present within the flow table, the memory of the hub node including instructions executable by the processor to:
extract the first flow information from the first data packet including the first VPN segment information and the first packet tuple information associated with the first data packet;
store, by the hub node, the first flow information at the flow table; and
transmit, over the network interface, the first data packet to the service chain element over the service chain VPN segment associated with the service chain element, wherein the first VPN segment is different from the service chain VPN segment.

15. The system of claim 13, where the network interface of the hub node receives the first data packet from the source branch over the first VPN segment and where the first flow information is present within the flow table, the memory of the hub node including instructions executable by the processor to:
associate, at the processor of the hub node, the first flow information from the flow table with the first data packet including the first VPN segment information and the first packet tuple information associated with the first data packet; and
transmit, over the network interface, the first data packet to the service chain element over the service chain VPN segment associated with the service chain element, wherein the first VPN segment is different from the service chain VPN segment.

16. The system of claim 13, the memory of the hub node including instructions executable by the processor to:
identify, at the processor and based on a match between the first packet tuple information of the first data packet and the first flow information within the flow table, that the first data packet is associated with the first flow and the first VPN segment.

17. One or more non-transitory computer-readable media comprising computer-readable instructions, executable by one or more processors of a hub node of an SD-WAN network to perform a method for facilitating service chain sharing in the SD-WAN network, the method including:
- receiving, at the hub node and from a source branch over a first Virtual Private Network (VPN) segment, a first data packet of a first flow destined for a destination branch;
- extracting, at the hub node from the first data packet, first flow information about the first flow, wherein the first flow information includes first VPN segment information and first packet tuple information associated with the first data packet;
- transmitting, by the hub node, the first data packet to a service chain element over a service chain VPN segment associated with the service chain element, wherein the first VPN segment is different from the service chain VPN segment;
- receiving, at the hub node and from the service chain element over the service chain VPN segment, the first data packet after the first data packet was processed by the service chain element;
- retrieving, at the hub node and based on the first packet tuple information associated with the first data packet, the first VPN segment information of the first flow associated with the first VPN segment; and
- transmitting, by the hub node, the first data packet to the destination branch over the first VPN segment based on the first VPN segment information.

18. The one or more non-transitory computer-readable media of claim 17, the first data packet including a header including first metadata, the first metadata including the first VPN segment information that indicates the first VPN segment and the first packet tuple information for the first data packet, the method further comprising:
- removing the first VPN segment information from the header prior to transmission of the first data packet to the service chain element over the service chain VPN segment.

19. The one or more non-transitory computer-readable media of claim 17, further comprising instructions executable by the one or more processors of the hub node of the SD-WAN network to perform the method for facilitating service chain sharing in the SD-WAN network, the method including:
- searching, at the hub node and based on the first packet tuple information of the first data packet, a flow table for retrieval of the first VPN segment information of the first flow associated with the first data packet,
- wherein the flow table includes the first flow information extracted by the hub node and associates the first packet tuple information of the first data packet with the first flow information.

20. The one or more non-transitory computer-readable media of claim 19, further comprising instructions executable by the one or more processors of the hub node of the SD-WAN network to perform the method for facilitating service chain sharing in the SD-WAN network, the method including:
- identifying, at the hub node and based on a match between the first packet tuple information of the first data packet and the first flow information within the flow table, that the first data packet is associated with the first flow and the first VPN segment.

* * * * *